US010013476B2

(12) United States Patent
Tee

(10) Patent No.: US 10,013,476 B2
(45) Date of Patent: *Jul. 3, 2018

(54) SYSTEM FOR DECOMPOSING CLUSTERING EVENTS FROM MANAGED INFRASTRUCTURES

(71) Applicant: Moogsoft, Inc., San Francisco, CA (US)

(72) Inventor: Philip Tee, San Francisco, CA (US)

(73) Assignee: Moogsoft, Inc., San Francisco, CA (US)

( * ) Notice: Subject to any disclaimer, the term of this patent is extended or adjusted under 35 U.S.C. 154(b) by 537 days.

This patent is subject to a terminal disclaimer.

(21) Appl. No.: 14/325,521

(22) Filed: Jul. 8, 2014

(65) Prior Publication Data

US 2015/0310085 A1 Oct. 29, 2015

Related U.S. Application Data

(63) Continuation-in-part of application No. 14/262,861, filed on Apr. 28, 2014, now Pat. No. 9,607,074, and
(Continued)

(51) Int. Cl.
G06F 3/048 (2013.01)
G06F 17/30 (2006.01)
(Continued)

(52) U.S. Cl.
CPC ..... *G06F 17/30598* (2013.01); *G06Q 10/107* (2013.01); *H04L 12/1895* (2013.01);
(Continued)

(58) Field of Classification Search
None
See application file for complete search history.

(56) References Cited

U.S. PATENT DOCUMENTS

| 5,341,142 A | 8/1994 | Reis et al. |
|---|---|---|
| 6,195,103 B1 | 2/2001 | Stewart |

(Continued)

FOREIGN PATENT DOCUMENTS

| EP | 0171190 A2 | 2/1986 |
|---|---|---|
| EP | 0271255 A2 | 6/1988 |
| EP | 2 112 603 A2 | 10/2009 |

OTHER PUBLICATIONS

Office Action dated Feb. 16, 2016.
(Continued)

*Primary Examiner* — William C Trapanese
(74) *Attorney, Agent, or Firm* — Paul Davis

(57) ABSTRACT

An event clustering system is configured to generate reports. An extraction engine is in communication with an infrastructure. The extraction engine in operation receives data from the infrastructure and produces events. An alert engine receives the events and creates alerts mapped into a matrix, M. A sigalizer engine includes one or more of an NMF engine, a k-means clustering engine and a topology proximity engine. The sigalizer engine determines one or more common steps from events and produces clusters relating to the alerts and or events. A reporting engine is configured to be coupled to the event clustering system.

23 Claims, 26 Drawing Sheets

Related U.S. Application Data a continuation-in-part of application No. 14/262,884, filed on Apr. 28, 2014, now Pat. No. 9,607,075, and a continuation-in-part of application No. 14/262,890, filed on Apr. 28, 2014, now Pat. No. 9,535,973.

(51) Int. Cl.
*H04L 12/58* (2006.01)
*H04L 12/24* (2006.01)
*H04L 12/18* (2006.01)
*G06Q 10/10* (2012.01)

(52) U.S. Cl.
CPC ............ *H04L 41/065* (2013.01); *H04L 41/12* (2013.01); *H04L 41/22* (2013.01); *H04L 51/16* (2013.01); *H04L 51/22* (2013.01); *H04L 51/24* (2013.01)

(56) References Cited

U.S. PATENT DOCUMENTS

| | | |
|---|---|---|
| 6,323,846 B1 | 11/2001 | Westerman et al. |
| 6,570,557 B1 | 5/2003 | Westerman et al. |
| 6,677,932 B1 | 1/2004 | Westerman |
| 6,888,536 B2 | 5/2005 | Westerman et al. |
| 7,603,458 B1 | 10/2009 | Sexton et al. |
| 7,614,008 B2 | 11/2009 | Ording |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,844,914 B2 | 11/2010 | Andre et al. |
| 8,006,002 B2 | 8/2011 | Kalayjian et al. |
| 8,140,523 B2 | 3/2012 | Fakhouri |
| 8,176,475 B2 | 5/2012 | Kosche et al. |
| 8,239,784 B2 | 8/2012 | Hotelling et al. |
| 8,279,180 B2 | 10/2012 | Hotelling et al. |
| 8,356,086 B2 | 1/2013 | Liu et al. |
| 8,375,068 B1 | 2/2013 | Platt |
| 8,381,135 B2 | 2/2013 | Hotelling et al. |
| 8,479,122 B2 | 7/2013 | Hotelling et al. |
| 8,600,430 B2 | 12/2013 | Herz et al. |
| 8,706,683 B1 | 4/2014 | Todd |
| 8,762,285 B2 | 6/2014 | Davis |
| 2004/0111438 A1* | 6/2004 | Chitrapura ............... G06F 17/30 |
| 2005/0256901 A1 | 11/2005 | Banks et al. |
| 2006/0026536 A1 | 2/2006 | Hotelling et al. |
| 2006/0033724 A1 | 2/2006 | Chaudhri et al. |
| 2006/0080466 A1 | 4/2006 | Yamaguchi et al. |
| 2006/0197753 A1 | 9/2006 | Hotelling |
| 2008/0189718 A1 | 8/2008 | Gulley |
| 2009/0125916 A1 | 5/2009 | Lu |
| 2009/0177484 A1 | 7/2009 | Davis et al. |
| 2009/0271433 A1 | 10/2009 | Perronnin et al. |
| 2009/0299809 A1 | 12/2009 | Dettori et al. |
| 2011/0064268 A1 | 3/2011 | Cobb |
| 2012/0041575 A1* | 2/2012 | Maeda ................. G05B 23/024 700/80 |
| 2012/0117254 A1 | 5/2012 | Ehrlich et al. |
| 2012/0150860 A1 | 6/2012 | Bhamidipati et al. |
| 2012/0185418 A1* | 7/2012 | Capman ............... G06N 99/005 706/12 |
| 2012/0216243 A1* | 8/2012 | Gill ......................... G06F 21/55 726/1 |
| 2012/0233417 A1 | 9/2012 | Kalach et al. |
| 2012/0246718 A1* | 9/2012 | Spears ................... G06Q 30/02 726/21 |
| 2013/0024166 A1 | 1/2013 | Herzog |
| 2013/0159502 A1* | 6/2013 | Thompson .......... H04L 63/0815 709/224 |
| 2013/0268839 A1* | 10/2013 | Lefebvre ................. G06F 17/21 715/234 |
| 2013/0298192 A1 | 11/2013 | Kumar et al. |
| 2014/0068629 A1 | 3/2014 | Boller et al. |
| 2014/0172371 A1* | 6/2014 | Zhu ..................... G06F 11/0709 702/185 |
| 2015/0254513 A1* | 9/2015 | Mansour ............... G06K 9/00744 382/190 |

OTHER PUBLICATIONS

PCT/US2015/028004 Search Report dated Jul. 6, 2015.
PCT/US2015/027914 Search Report dated Jul. 14, 2015.
PCT/US2015/028022 Search Report dated Jul. 10, 2015.
Creating Pentaho Dashboards dated Jan. 3, 2014.
Yan Chen, et al., Autonomous Mining for Alarm Correlation Patterns based on Time-Shift Similarity Clustering in Manufacturing System, Prognostics and Health Management (PHM), 2011 IEEE conference on, IEEE, Jun. 20, 2011, pp. 1-8.
Joshua Ojo Nehinbe, Log Analyzer for Network Forensics and Incident Reporting, Intelligent Systems, Modelling and Simulation (ISMS), 2010 International Conference on, IEEE, Piscataway, NJ, USA, Jan. 27, 2010, pp. 356-361. Abstract.

* cited by examiner

All Situations

| Tr | ID | Category | Created All | Last Change | Moderator | Status | Description | Process | Service | Scop | Queu | Total | Story |
|---|---|---|---|---|---|---|---|---|---|---|---|---|---|
| bla | 79 | Detected | blah | blah | phil | blah | blah | blah | Website | blah | Queu | blah | 79 |
| bla | 99↻79 | Detected | blah | blah | phil | blah | blah | blah | Website | blah | Queu | blah | 79 |
| bla | 15 | Detected | blah | blah | phil | blah | blah | blah | Website | blah | Queu | blah | |
| bla | 14 | blah | blah | blah | phil | blah | blah | blah | Website | blah | Queu | blah | |
| bla | 13 | blah | blah | blah | phil | blah | blah | blah | Website | blah | Londo | blah | |
| bla | 33↻79 | Supercede | blah | blah | phil | blah | blah | blah | Website | blah | Londo | blah | 79 |
| bla | 8 | blah | blah | blah | phil | blah | blah | blah | Website | blah | Londo | blah | |
| bla | 11↻79 | Supercede | blah | blah | phil | blah | blah | blah | Website | blah | | blah | 79 |
| bla | 10 | blah | blah | blah | phil | blah | blah | blah | Website | blah | | blah | |

All Alerts

| Host | Manage | Active | Superceded | Significanc | Type | Count | Severit | Owned | Status | Last Occurence | Description |
|---|---|---|---|---|---|---|---|---|---|---|---|
| host12 | mon | 33 | 23, 22, 20 | Impacting | type | 332 | Warnin | Phil | Assigned | 12:12:12 | This is an |
| host13 | mon44 | 31 | Impacting | type1 | 21 | | Warnin | Phil | Assigned | 12:12:12 | This is an alert |
| host 23 | mon | 12,79 | 4,5 | Impacting | type | 33 | Warnin | Phil | Assigned | 12:12:12 | This is an |
| host 3 | mon | 79 | 2,15,11 | Impacting | type | 110 | Warnin | Phil | Assigned | 12:12:12 | This is an |

Hidden by default

2 Services Impacted
695 Total Alerts
1,554 Total Events

Display Query View: ZOK_QN

Query View ID:* ZOK_QN  Quick Info Text: [          ]

Description: XC Quality Notification

Table ID: [          ]  Chart ID: ZOK_XC1

Enable Personalization: [x]

Private: [x]  Owner: KREINDLINA

⟵ 196

Queries

| Query ID | Table View | Description |
|---|---|---|
| ZOK_QN | TABLE_ZOK_QN | standard query generated from ZOK_QN |
|  |  |  |
|  |  |  |
|  |  |  |

⟵ 198

| Input Fields | Output Fields | Layout for Quick View | Subject-Based View Assignments | | Chart Views | Authorization | | |
|---|---|---|---|---|---|---|---|---|
| Query ID | Query Field ID | Description of Query Field | Sequence | Allow Aggr | Sequence | Sorting | Sort Seq. | |
| ZOK_QN | CODE_TEXT | Short Text for Code (up to 40 Characters in Length) | 1 |  | 1 | - |  |  |
| ZOK_QN | ZDAM_NUM | Number of damages | 2 |  |  | - |  |  |
| ZOK_QN | D_CAT_TYP | Catalog Type Problem | 3 |  | 2 | - |  |  |
| ZOK_QN | D_CODE | Problem or Damage Code | 4 |  |  | - |  |  |

SYSTEM FOR DECOMPOSING CLUSTERING EVENTS FROM MANAGED INFRASTRUCTURES

CROSS-REFERENCE TO RELATED APPLICATIONS

This application claims the benefit of Ser. No. 14/262,861 filed Apr. 28, 2014, Ser. No. 14/262,884, filed Apr. 28, 2014, and Ser. No. 14/262,890 filed Apr. 28, 2014, all of which applications are fully incorporated herein by reference.

BACKGROUND

Field of the Invention

This invention relates generally to event/message processing, and more particularly to clustering messages/events received from infrastructure and report generation.

Description of the Related Art

The World Wide Web is increasingly becoming a more important and more frequently used form of communication between people. The primary form of web-based communication is electronic mail. Other forms of communication are also used, however, such as news groups, discussion groups, bulletin boards, voice-over IP, and so on. Because of the vast amount of information that is available on the web, it can be difficult for a person to locate information that may be of interest. For example, a person who receives hundreds of electronic mail messages/events from infrastructure a day may find it impractical to take the time to store the messages/events from infrastructure in folders of the appropriate topic. As a result, it may be difficult for the person to later find and retrieve all messages/events from infrastructure related to the same topic. A similar situation arises when a person tries to locate news groups or discussion groups of interest. Because there may be no effective indexing of these groups, it can be difficult for the person to find groups related to the topic of interest.

Some attempts have been made to help the retrieval of information of interest by creating web directories that provide a hierarchical organization of web-based information. The process of creating the directories and deciding into which directory a particular piece of information (e.g., a news group) should go is typically not automated. Without an automated approach it is impractical to handle the massive amounts of web-based information that are being generated on a daily basis. Moreover, because a person may not be fully aware of the entire web directory hierarchy or may not fully understand the semantics of information, the person may place the information in a directory that is not the most appropriate, making later retrieval difficult. It would be desirable to have an automated technique that would help organize such information.

The advent of global communications networks such as the Internet has provided alternative forms of communicating worldwide. Additionally, it has increased the speed at which communications can be sent and received. Not only can written or verbal messages/events from infrastructure be passed through the Internet, but documents, sound recordings, movies, and pictures can be transmitted by way of the Internet as well. As can be imagined, inboxes are being inundated with countless items. The large volume can more than difficult to manage and/or organize for most users.

In particular, a few of the more common activities that a user performs with respect to email, for example, are: sorting of new messages/events from infrastructure, task management of using messages/events from infrastructure that can serve as reminders, and retrieval of past messages/events from infrastructure. Retrieval of recent messages/events from infrastructure can be more common than older messages/events from infrastructure. Traditional systems employed today support at least some aspect of these three activities using folders such as an inbox, task-oriented folders, and user-created folders, respectively. However, this as well as other existing approaches present several problems. The folders make stark divisions between the three activities which are not conducive or coincident with user behavior, in general. For example, tasks are not visible to the user, or rather are "out of sight, out of mind", and thus can be easily, if not frequently, neglected, overlooked, or forgotten. In addition, in many current systems any given message can only be in one folder at a time. Hence, the particular message cannot serve multiple activities at once. Other current systems have attempted to ease these problems; however, they fall short as well for similar reasons.

A user can communicate using one or more different messaging techniques known in the art: email, instant messaging, social network messaging, cellular phone messages/events from infrastructure, etc. Typically, the user can accumulate a large collection of messages/events from infrastructure using one or more of these different messaging techniques. This user collection of messages/events from infrastructure can be presented as a large collection of messages/events from infrastructure with limited options of grouping or clustering the messages/events from infrastructure.

One way of grouping messages/events from infrastructure is to group multiple emails into an email thread. An email thread is a collection of emails that are related based on the subjects of the emails. For example, one user sends an email to one or more users based on a given subject. Another user replies to that email and a computer would mark those two emails as belonging to a thread. Another way for grouping messages/events from infrastructure is put the messages/events from infrastructure into folders. This can be done manually by the user or can be done automatically by the user setting up rules for message processing.

Document clustering and classification techniques can provide an overview or identify a set of documents based upon certain criteria, which amplifies or detects certain patterns within its content. In some applications these techniques lead to filtering unwanted email and in other applications they lead to effective search and storage strategies. An identification strategy may for example divide documents into clusters so that the documents in a cluster are similar to one another and are less similar to documents in other clusters, based on a similarity measurement. One refers to the process of clustering and classification as labeling. In demanding applications labeling can greatly improve the efficiency of an enterprise, especially for storage and retrieval applications, provided that it is stable, fast, efficient, and accurate.

Users of information technology must effectively deal with countless unwanted emails, unwanted text messages/events from infrastructure and crippling new viruses and worms every day. This largely unnecessarily high volume of network traffic decreases worker productivity and slows down important network applications. One of the most serious problems in today's digital economy has to do with the increasing volume of spam. As such, recipients of email as well as the service providers need effective solutions to reduce its proliferation on the World Wide Web. However, as spam detection becomes more sophisticated, spammers invent new methods to circumvent detection. For example, one prior art methodology provides a centralized database for maintaining signatures of documents having identified attributes against which emails are compared, however, spammers now modify the content of their email either slightly or randomly such that the message itself may be intelligible, but it evades detection under various anti-spam filtering techniques currently employed.

At one time, at least 30 open relays dominated the world, bursting messages/events from infrastructure at different rates and different levels of structural variation. Because certain types of email mutate or evolve, as exemplified by spam, spam-filtering detection algorithms must constantly adjust to be effective. In the case of spam email, for example, the very nature of the spam corpus undergoes regime changes. Therefore, clustering optimality depends heavily on the nature of the data corpus and the changes it undergoes.

Decomposing a traffic matrix has proven to be challenging. In one method, a matrix factorization system is used to extract application dependencies in an enterprise network, a cloud-based data center, and other like data centers, using a temporal global application traffic graph dynamically constructed over time and spatial local traffic observed at each server of the data center. The data center includes a plurality of servers running a plurality of different applications, such as e-commerce and content delivery. Each of the applications has a number of components such as a, web server, application server and database server, in the application's dependency path, where one or more of the components are shared with one or more of the other applications.

Because such data centers typically host a large number of multi-tier applications, the applications requests are overlapped, both in the spatial and temporal domains, making it very difficult for conventional pairwise statistical correlation techniques to correctly extract these interleaved but independent applications. A matrix-based representation of application traffic is used which captures both system snapshots and their historical evolution. The system and method decomposes a matrix representation of application graphs into small sub-graphs, each representing a single application.

The number of applications is usually unknown a priori due to interleaving and overlapping application requests, which further imposes a challenge to discovery of the individual application sub-graphs. In one prior method and system, the number of applications is determined using low rank matrix estimation either with singular value decomposition or power factorization based solvers, under complete and incomplete traffic data scenarios, with theoretical bound guarantee.

Traffic tapping from switches is limited by the capability of switches as well as the monitoring hosts. A switch typically can mirror only a few ports at the same time. In addition, monitoring data collected over multiple switches, each with multiple ports may result in high-volume aggregate network traffic and potentially packet loss. Both cases lead to significant loss in the monitoring data.

One system and method to overcome this problem utilizes historical data to provide redundancy and employs power factorization based techniques to provide resilience to data loss and estimation errors. In one system and method, a distributed network monitors and centralizes data processing to determine application dependency paths in a data center.

The majority of current service management solutions are rule based. The concept behind rule-based systems is that you start with the system you are monitoring, analyze and model it, turning it into a series of business logic rules that respond to events as they occur. For example, in response to some logged text, you apply logic that turns the text into a database record to which you apply more logic that turns it into an alert, before applying again more logic to connect the alert to a trouble ticket.

The fundamental problem with this approach is that the rules are dependent on a point in time snapshot of what is out there that you are managing, which is subject to continual change. So, every time the infrastructure alters the business logic must be modified. Clearly the rule-based approach is not a scalable way of running a business.

SUMMARY

An object of the present invention is to provide an event clustering system and report generation.

Another object of the present invention is to provide an event clustering system that includes a sigalizer engine and is configured to generate reports.

A further object of the present invention is to provide an event clustering system that determines one or more common steps from clustering events, produces clusters relating to alerts and or clustering events, and is configured to generate reports.

Yet another object of the present invention is to provide an event clustering system that utilizes a plurality that determines one or more common steps from events to produce clusters, utilizes hop and proximity of a source of the event and is configured to generate reports.

Still another object of the present invention is to provide an event clustering system that utilizes a plurality that determines one or more common steps from events to produce clusters, uses graphing technology with vectors and is configured to generate reports.

Another object of the present invention is to provide an event clustering system that uses events from infrastructure, which is typically managed, that includes, computers, network devices, appliances, mobile devices, text or numerical values from which those text or numerical values indicate a state of any hardware or software component of the infrastructure, and is configured to generate reports.

Another object of the present invention is to provide an event clustering system that uses events from infrastructure that generates data which include attributes selected from at least one of, time, source a description of the event, textural or numerical values indicating a state of the infrastructure, and is configured to generate reports.

These and other objects of the present invention are achieved in, an event clustering system that generates reports. An extraction engine is in communication with an infrastructure. The extraction engine in operation receives data from the infrastructure and produces clustering events. An alert engine receives the clustering events and creates alerts mapped into a matrix, M. A sigalizer engine includes one or more of an NMF engine, a k-means clustering engine and a topology proximity engine. The sigalizer engine determines one or more common steps from clustering events and produces clusters relating to the alerts and or clustering events. A reporting engine is configured to be coupled to the event clustering system.

BRIEF DESCRIPTION OF THE DRAWINGS

FIGS. 3(a) and 3(b) illustrate embodiments of dashboards that can be accessed by users of the event clustering system.

FIG. 17 is a screen display that allows a user to choose a chart view in order to display data in a graphical format.

DETAILED DESCRIPTION

Figure 1:
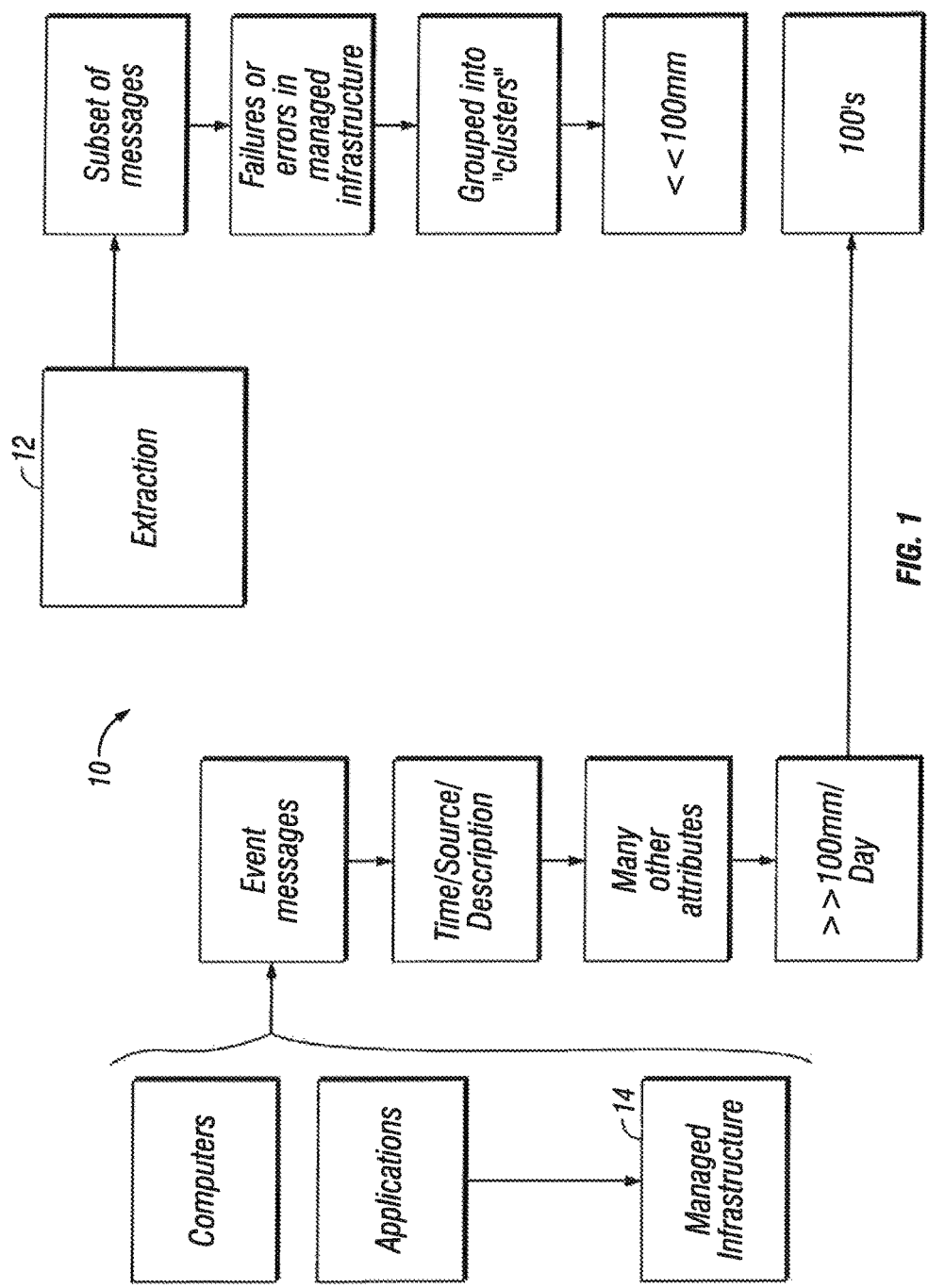
FIG. 1 illustrates one embodiment of an event clustering system of the present invention.

As used herein, the term engine refers to software, firmware, hardware, or other component that can be used to effectuate a purpose. The engine will typically include software instructions that are stored in non-volatile memory (also referred to as secondary memory) and a processor with instructions to execute the software. When the software instructions are executed, at least a subset of the software instructions can be loaded into memory (also referred to as primary memory) by a processor. The processor then executes the software instructions in memory. The processor may be a shared processor, a dedicated processor, or a combination of shared or dedicated processors. A typical program will include calls to hardware components (such as I/O devices), which typically requires the execution of drivers. The drivers may or may not be considered part of the engine, but the distinction is not critical.

As used herein, the term database is used broadly to include any known or convenient means for storing data, whether centralized or distributed, relational or otherwise.

As used herein a mobile device includes, but is not limited to, a cell phone, such as Apple's iPhone®, other portable electronic devices, such as Apple's iPod Touches®, Apple's iPads®, and mobile devices based on Google's Android® operating system, and any other portable electronic device that includes software, firmware, hardware, or a combination thereof that is capable of at least receiving a wireless signal, decoding if needed, and exchanging information with a server to send and receive cultural information data including survey data. Typical components of mobile device may include but are not limited to persistent memories like flash ROM, random access memory like SRAM, a camera, a battery, LCD driver, a display, a cellular antenna, a speaker, a BLUETOOTH® circuit, and WIFI circuitry, where the persistent memory may contain programs, applications, and/or an operating system for the mobile device.

As used herein, the term "computer" is a general purpose device that can be programmed to carry out a finite set of arithmetic or logical operations. Since a sequence of operations can be readily changed, the computer can solve more than one kind of problem. A computer can include of at least one processing element, typically a central processing unit (CPU) and some form of memory. The processing element carries out arithmetic and logic operations, and a sequencing and control unit that can change the order of operations based on stored information. Peripheral devices allow information to be retrieved from an external source, and the result of operations saved and retrieved. Computer also includes a graphic display medium.

As used herein, the term "Internet" is a global system of interconnected computer networks that use the standard Internet protocol suite (TCP/IP) to serve billions of users worldwide. It is a network of networks that consists of millions of private, public, academic, business, and government networks, of local to global scope, that are linked by a broad array of electronic, wireless and optical networking technologies. The Internet carries an extensive range of information resources and services, such as the inter-linked hypertext documents of the World Wide Web (WWW) and the infrastructure to support email. The communications infrastructure of the Internet consists of its hardware components and a system of software layers that control various aspects of the architecture.

As used herein, the term "extranet" is a computer network that allows controlled access from the outside. An extranet can be an extension of an organization's intranet that is extended to users outside the organization in isolation from all other Internet users. An extranet can be an intranet mapped onto the public Internet or some other transmission system not accessible to the general public, but managed by more than one company's administrator(s). Examples of extranet-style networks include but are not limited to:

- LANs or WANs belonging to multiple organizations and interconnected and accessed using remote dial-up
- LANs or WANs belonging to multiple organizations and interconnected and accessed using dedicated lines Virtual private network (VPN) that is comprised of LANs or WANs belonging to multiple organizations, and that extends usage to remote users using special "tunneling" software that creates a secure, usually encrypted network connection over public lines, sometimes via an ISP.

As used herein, the term "Intranet" is a network that is owned by a single organization that controls its security policies and network management. Examples of intranets include but are not limited to:

A LAN

A Wide-area network (WAN) that is comprised of a LAN that extends usage to remote employees with dial-up access A WAN that is comprised of interconnected LANs using dedicated communication lines A Virtual private network (VPN) that is comprised of a LAN or WAN that extends usage to remote employees or networks using special "tunneling" software that creates a secure, usually encrypted connection over public lines, sometimes via an Internet Service Provider (ISP).

For purposes of the present invention, the Internet, extranets and intranets collectively are referred to as ("Network Systems").

For purposes of the present invention, the term "Infrastructure" means, information technology, the physical hardware used to interconnect computers and users, transmission media, including telephone lines, cable television lines, and satellites and antennas, and also the routers, aggregators, repeaters, computers, network devices, applications, and other devices that control transmission paths, software used to send, receive, and manage the signals that are transmitted, and everything, both hardware and software, that supports the flow and processing of information.

As used herein, "event message" or "event" is defined as a change in state. An event is anything that happens, or is contemplated as happening in message form or event form relating to infrastructure. An event can include a time stamp, and a name for the entity changing state.

Referring to FIG. 1, a system 10 is provided for clustering events received from an infrastructure 14.

In one embodiment the system 10 is an event clustering system 10 that includes an extraction engine 12 in communication with an infrastructure 14. As a non-limiting example, infrastructure 14 includes, computers, network devices, appliances, mobile devices, applications, connections of any of the preceding, text or numerical values from which those text or numerical values indicate a state of any hardware or software component of the infrastructure 14. The infrastructure 14 generates data that includes attributes. As a non-limiting example, the data is selected from at least one of, time, source a description of the event, textural or numerical values indicating a state of the infrastructure 14. The extraction engine 12 breaks event messages into subsets of messages that relate to failures or errors in the infrastructure 14. The subsets of messages can be grouped into clusters.

In one embodiment, the extraction engine 12 includes a server. The extraction engine 12 extracts text components from the event messages and converts them into words and subtexts. The extraction engine 12 then reformats data from the event messages to create reformatted data. In one embodiment, the reformatted data is received at a system bus.

Figure 2:
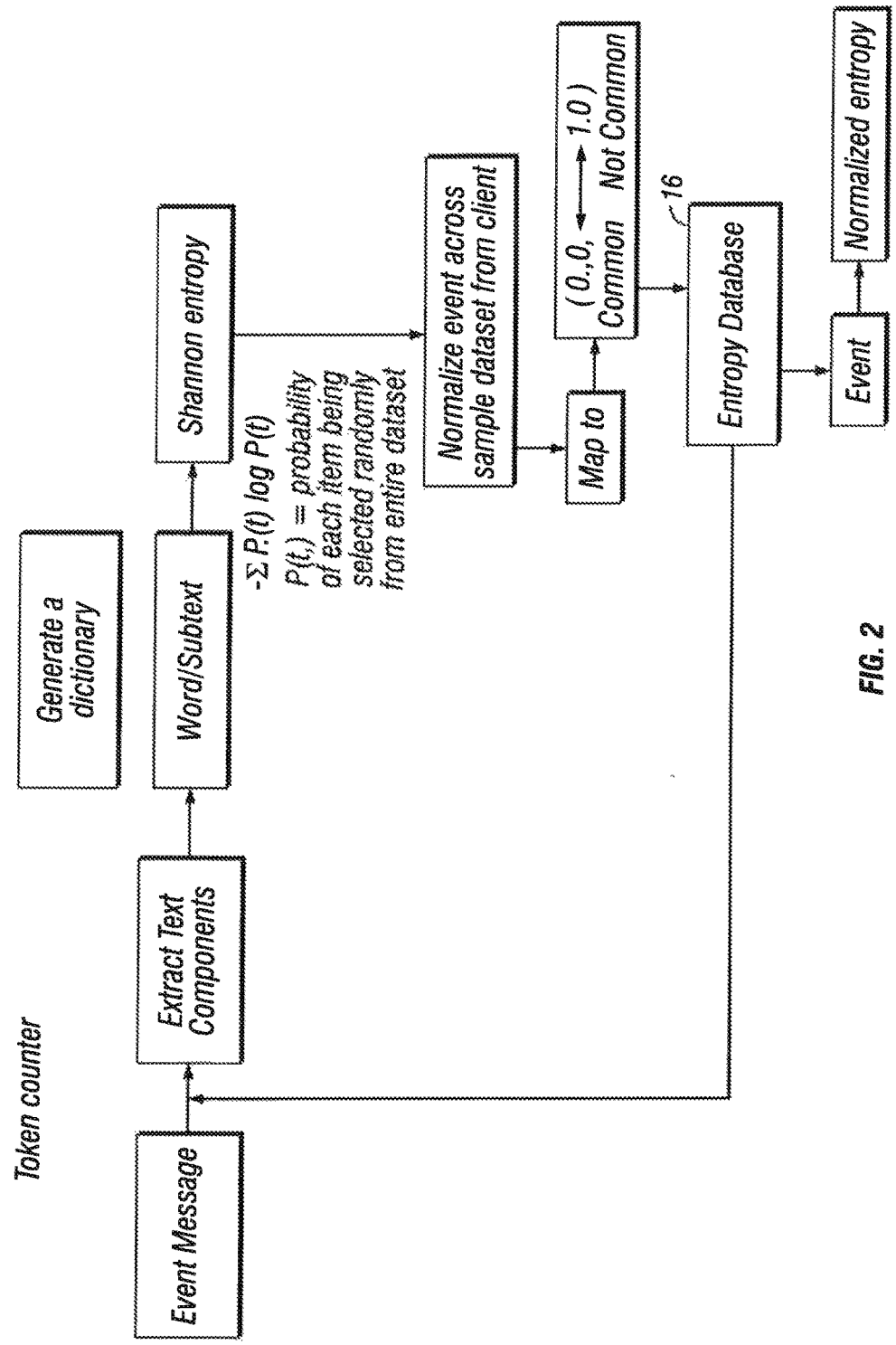
FIG. 2 illustrates a token counter, text extraction and implementation of Shannon entropy in one embodiment of the present invention.

The extraction engine 12 receives infrastructure 14 data and produces clustering events and populates a database 16 with a dictionary of event entropy. This can be achieved with a token counter as illustrated in FIG. 2. As a non-limiting example, the database 16 can be a no-SQL relational database 16. In one embodiment, an entropy database 16 is generated with the word and subtexts. As a non-limiting example the entropy database is generated using Shannon Entropy, −ln(1/NGen) and normalizes the words and subtexts as follows:

$$-\Sigma P \cdot (t) \log P(t)$$

where,

P(t,)=probability of each item is selected randomly from an entire dataset.

An entropy database can be provided. In one embodiment, the entropy normalizes clustering events across data, datasets, from the infrastructure 14. As a non-limiting example, normalized entropy for clustering events is mapped from a common, 0.0 and a non-common, 1.0, as discussed hereafter. Entropy is assigned to the alerts. The entropy for each event is retrieved from an entropy dictionary, as it enters the system 10. This can be done continuously in parallel with other operation of the extraction engine 12 or run non-continuously.

Figure 3B:
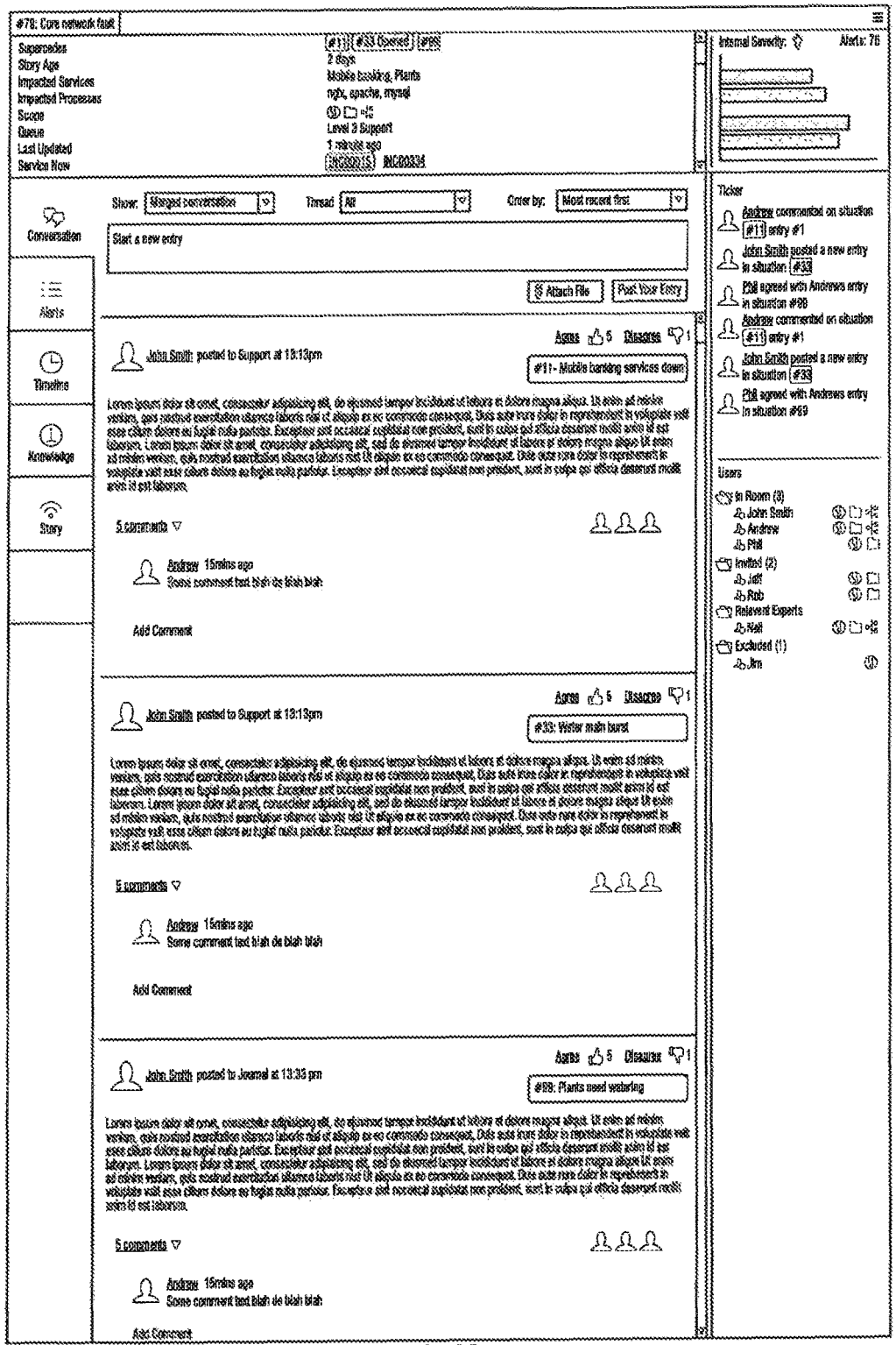

In one embodiment, illustrated in FIGS. 3(a) and 3(b) a dashboard 18, associated with a situational room, is included which allows entities and/or people to manipulate messages/clustering events from infrastructure, alerts or clustering events.

Figure 4:
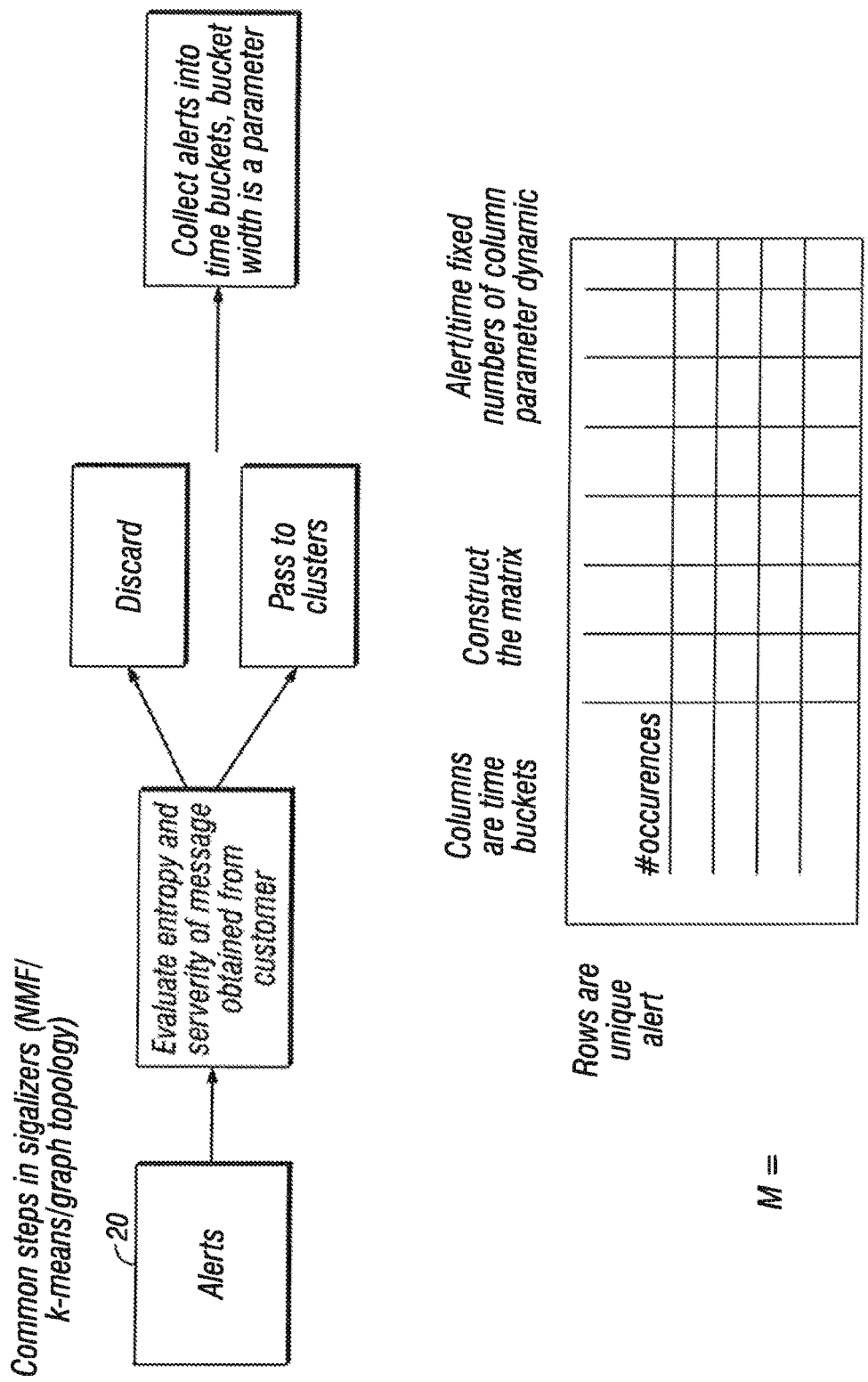
FIG. 4 illustrates processing of alerts, and a matrix M, in one embodiment of the present invention.

An alert engine 20 receives the clustering events and creates alerts that are mapped into a matrix "M" of clustering events, as illustrated in FIG. 4 and as more fully explained hereafter. As a non-limiting example, $M_{ik}$ is the matrix of clustering events.

Figure 5:
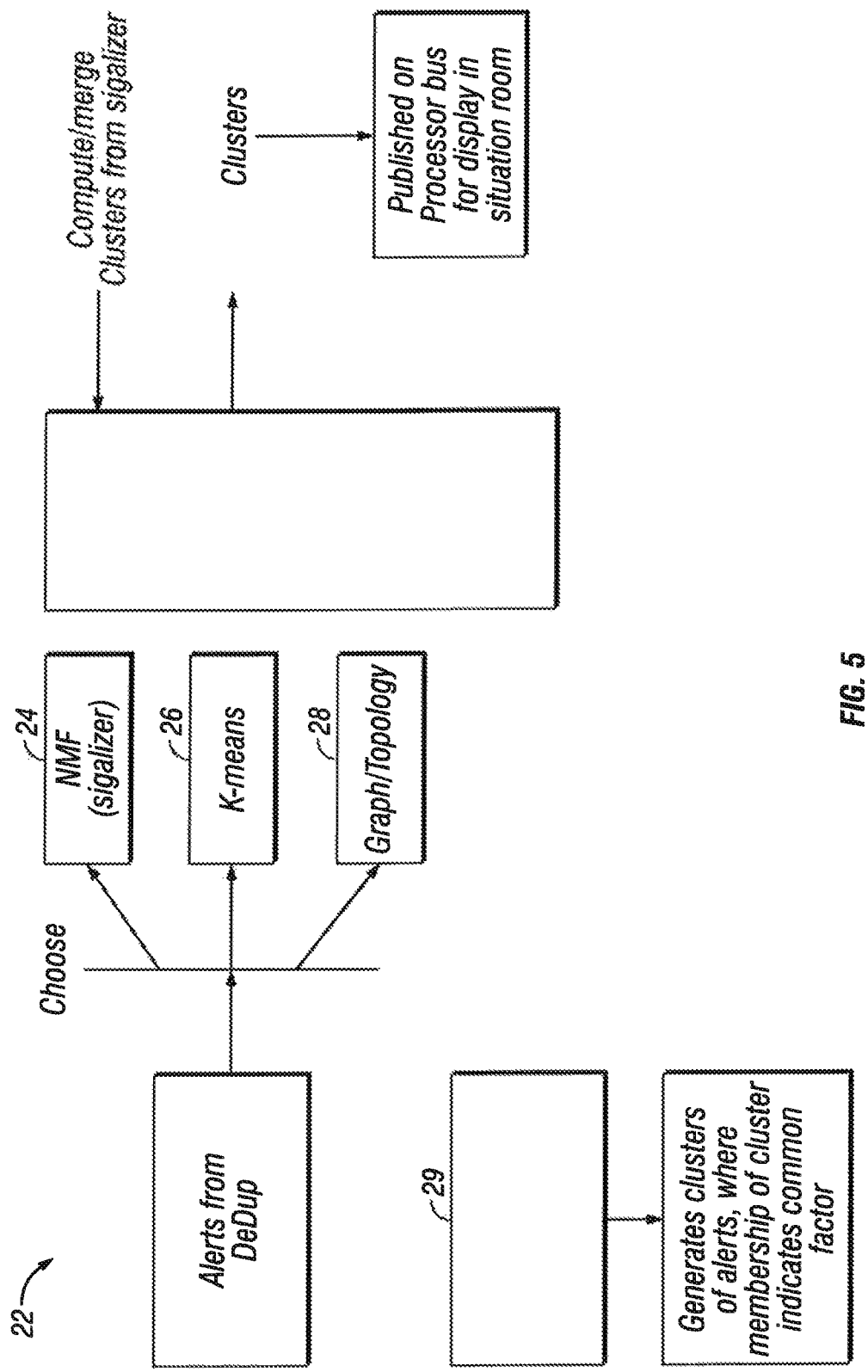
FIG. 5 illustrates an embodiment of a sigalizer engine and the creation of alerts where member of cluster indicates common factors in one embodiment of the present invention.

A sigalizer engine 22 includes a plurality of engines as illustrated in FIG. 5. As non-limiting examples, an NMF engine 24, a k-means clustering engine 26 and a topology proximity engine 28 are provided. Each signalizer engine 22 includes a processor and an arithmetic logic unit "ALU". Examples of suitable ALUs are found in EP 0171190 and EP 0271255, fully incorporated herein by reference. In one embodiment, the sigalizer engine 22 determines one or more steps from clustering events and produces clusters relating to the alerts and or clustering events.

The sigalizer engine 22 determines sigalizer common steps to ascertain how many clusters to extract from clustering events. Membership in a cluster indicates a common factor, which can be a failure or an actionable problem in the infrastructure 14. The sigalizer engine 22 generates clusters of alerts. In one embodiment, an independent failure count detection engine 29 is used for the production of common steps designated as "k" from clustering events. The independent failure count detection engine 29 can use SVD decomposition. The SVD decomposition is a continuation of a determination of sigalizer 22 common steps.

K is the number obtained from the common sigalizer steps. As a non-limiting example, common sigalizer steps are designated as $M_{ij}$, where i are unique clustering events and are the rows of M, j represents the time buckets in M. A value for $M_{ij}$ equals the number of occurrences of event i in time bucket j. This is the common input to the sigalizer engines 22.

Figure 6:
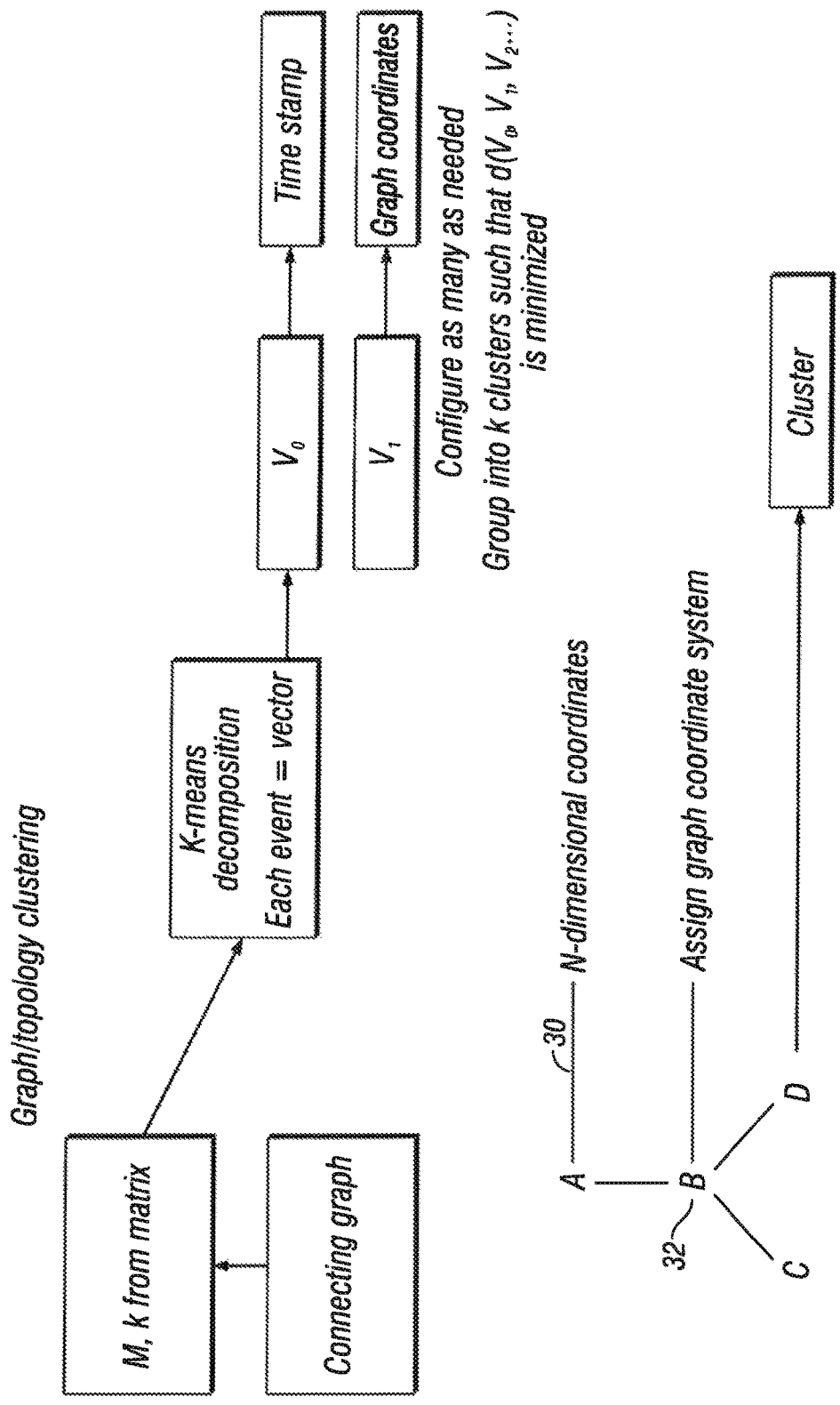
FIG. 6 illustrates k-mean decomposition, a created graph with graph coordinates in one embodiment of the present invention.

The topology proximity 28 creates a graph coordinate system, FIG. 6. In one embodiment the topology proximity 28 uses a source address for each event to assign a graph coordinate 30 of a graph 32, with nodes, to the event with an optional subset of attributes being extracted for each event and turned into a vector. The topology proximity engine 28 executes a graph topology and proximity algorithm.

Figure 7:
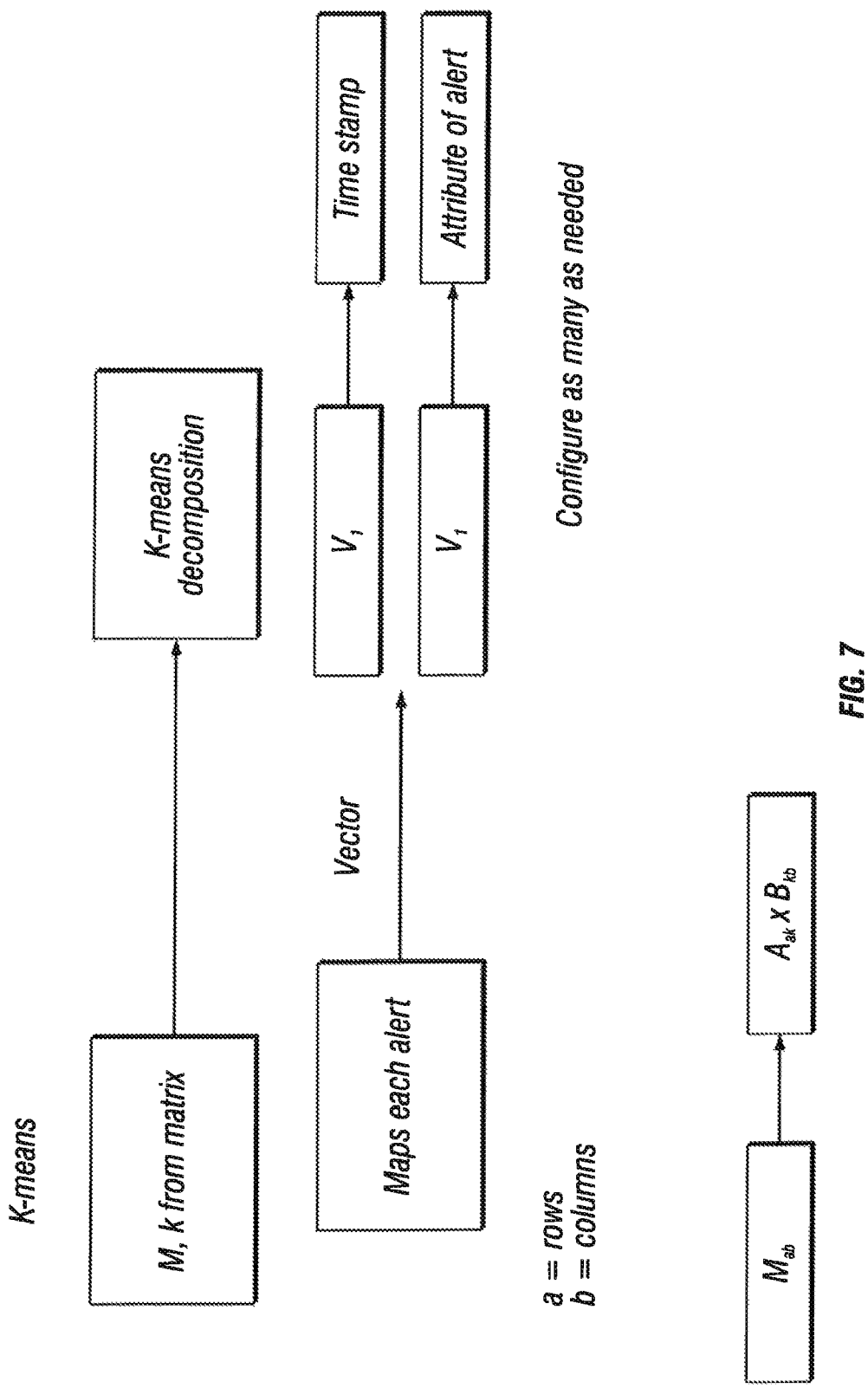
FIG. 7 illustrates one embodiment of alert mapping and vector generation in one embodiment of the present invention.

$M_{ik}$ undergoes K-means decomposition, FIG. 7. Each event is a transformed vector, where ($V_o$ is transformed time stamp, $V_i$-$V_n$ and so forth are transformed graph coordinates 30) are grouped into k clusters such that $d(V_i, V_2,)$ is minimized. In one embodiment, the topology engine 28 inputs a list of devices and a list of hops, where hop is a connection between components or nodes in the infrastructure 14.

As a non-limiting example, the graph 32 can be constructed of any number of points or nodes: A, B, C, and D, which relate to the source of an event. The result is a connecting graph 32, FIG. 6.

The topology proximity engine 28 receives the coordinate's mapping, and clusters are generated. V base nodes calculate a minimum hops to every other node which gives coordinate and the graph coordinates 30 are mapped.

In one embodiment, the k-means clustering engine 26 uses the graph coordinates 30 to cluster the clustering events using a k-means algorithm to determine hop proximity of the source of the event.

M,k is processed by the sigalizer engine 22. $M_{ab}$ is transformed to $A_{ak}$ ⊗ $B_{kb}$, where a equals rows, and b equals columns, x defines the normal operation of matrix multiplication. M is the matrix as stated above, and k is as recited above.

Figure 8:
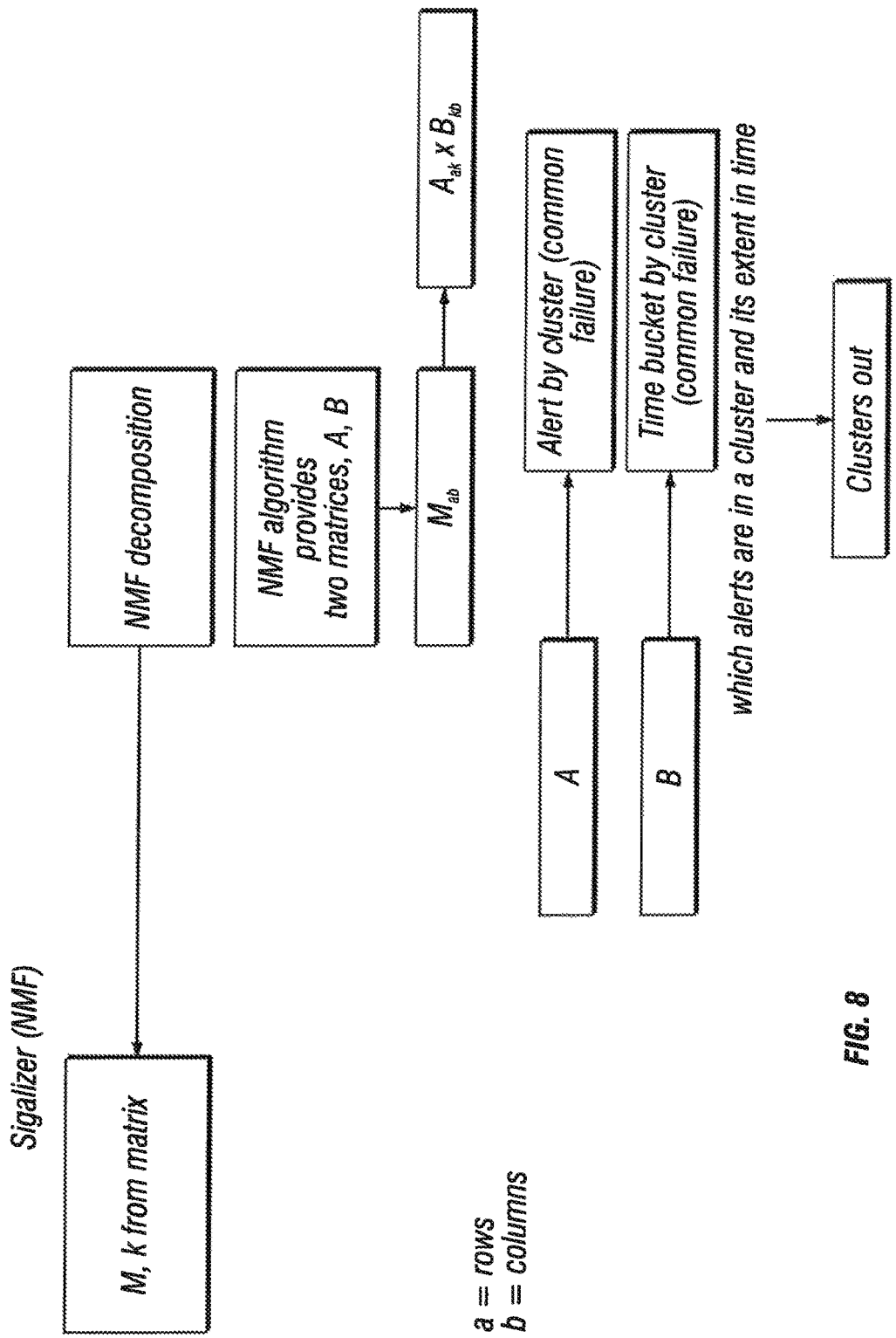
FIG. 8 illustrates NMF decomposition in one embodiment of the present invention.

The NMF algorithm produces two matrices, A and B, FIG. 8. A represents by cluster (a common failure) and B represents time bucket by cluster (a common failure). In one embodiment, the NMF engine 24 factors the matrix M into A and B, where A are deemed to be significant and are extracted, e.g, clusters deemed significant are extracted. The system 10 looks for significantly high values as compared to statistically significant values in the A and B matrix. If they are not statistically significant, they are dropped. The statistically significant elements of M are used to determine a cluster. As a non-liming example, the determination of significance is based on high signatures in the matrix. As above, those that are not high enough are dropped and not included in the output of clusters which is produced.

Each alert is mapped to a vector, $V_0$-$V_n$, where $V_o$ is a time stamp t; $V_i$ is an attribute of alert. In one embodiment, attributes of an event are mapped to a vector V.

The vectors are grouped into k clusters using k-means such that $d(V_i, V_2,)$ is a minimum in its own cluster.

In one embodiment the grouping is executed also using a standard Euclidian distance. In one embodiment, a weighting of components is supplied. The system 10 transforms the alert attributes into a number value that is used as the components of the vector. As a non-limiting example, an alert attribute is a textual value. In one embodiment, similar attributes are mapped to numbers that are also similar or close relative to the graph, with the closeness being dynamic and can be predetermined, changed, modified, set, and the like.

In one embodiment of the matrix, M, columns are slices in time and the rows are unique alerts. A unique alert is received from the deduplication engine which eliminates duplications and creates unique alerts.

In one embodiment, the matrix, M is created with alert/time and a fixed number of common alerts. The matrix M can be dynamic and change in time. The matrix M includes rows that can be unique alerts. The matrix includes columns that are time buckets, and a number of occurrences are plotted.

Evaluated clustering events are either discarded or passed to clusters with alerts are collected into time buckets and mapped in the matrix M. In one embodiment, a bucket width is a parameter that can be an input to the signalizer engine 22.

Outputs from the sigalizer engines 22 are received at a compare and merge engine 34. The compare and merge engine 34 communicates with one or more user interfaces 36 in the situation room 18, FIG. 9. The three sigalizer algorithms are used with the comparison or merger engine 34 and clusters are published on the a system bus 38 for display in the situation room 18.

As a non-limiting example, the bus 38 can be a publication message bus. As a non-limiting example, the bus 38 processes anything that goes from A to B, and from B to A. In one embodiment, a data bus web server is coupled to user interfaces as illustrated in.

Figure 9:
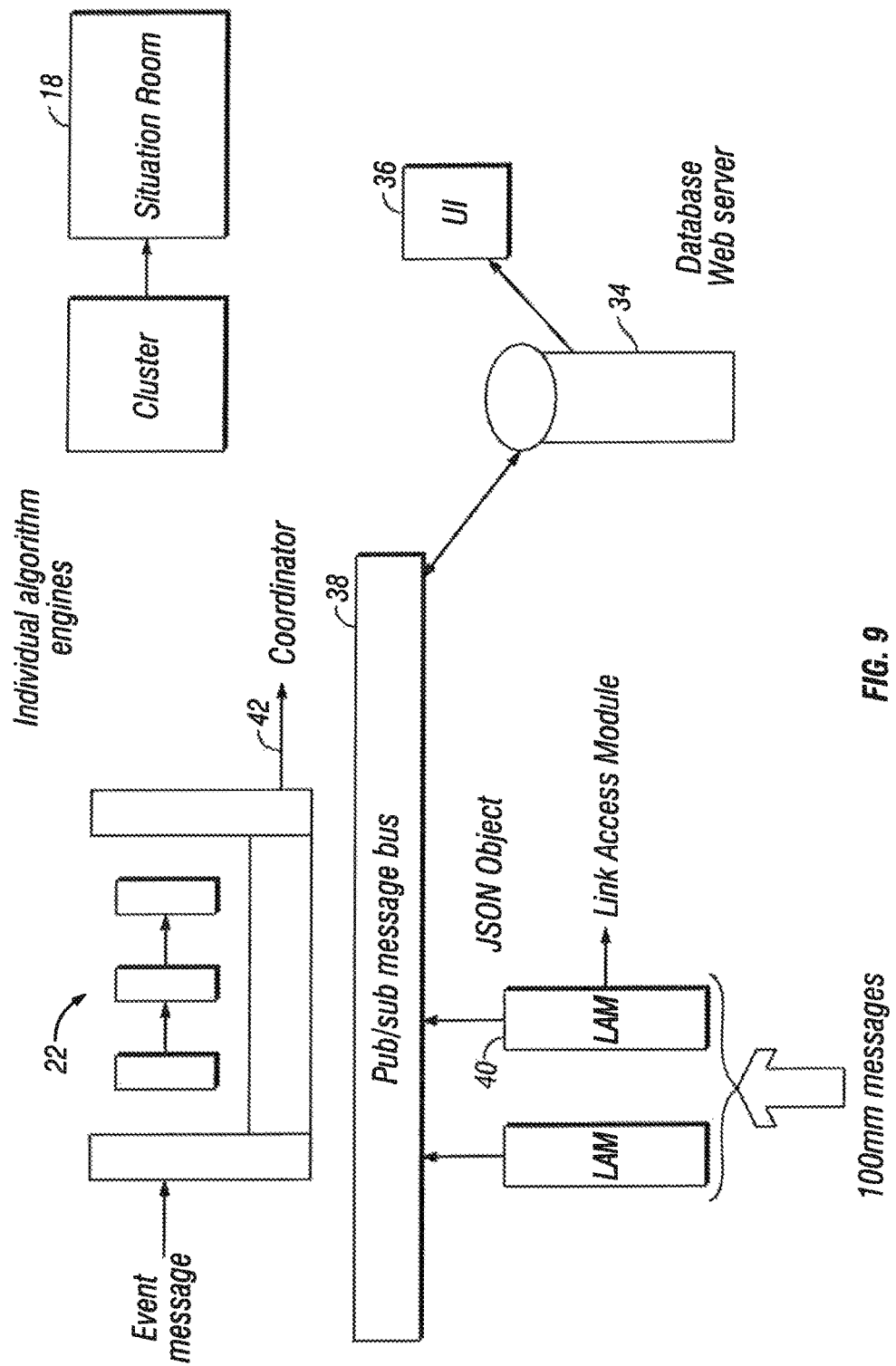
FIG. 9 illustrates the interaction of link access modules with a message bus, algorithm engines, cluster creation and a situation room in one embodiment of the present invention.

As illustrated in FIG. 9, a plurality of link access modules 40 are in communication with the data bus 38 and receive messages/clustering events. Events are received by a coordinator 42 that executes clustering of the clustering events.

In one embodiment, normalized words and subtexts are mapped to a common, 0.0 and a non-common, 1.0, as illustrated in FIG. 2.

The alerts can be run in parallel with the activities of the system 10. The alerts are passed to the sigalizer engine 22, FIG. 5.

Figure 10:
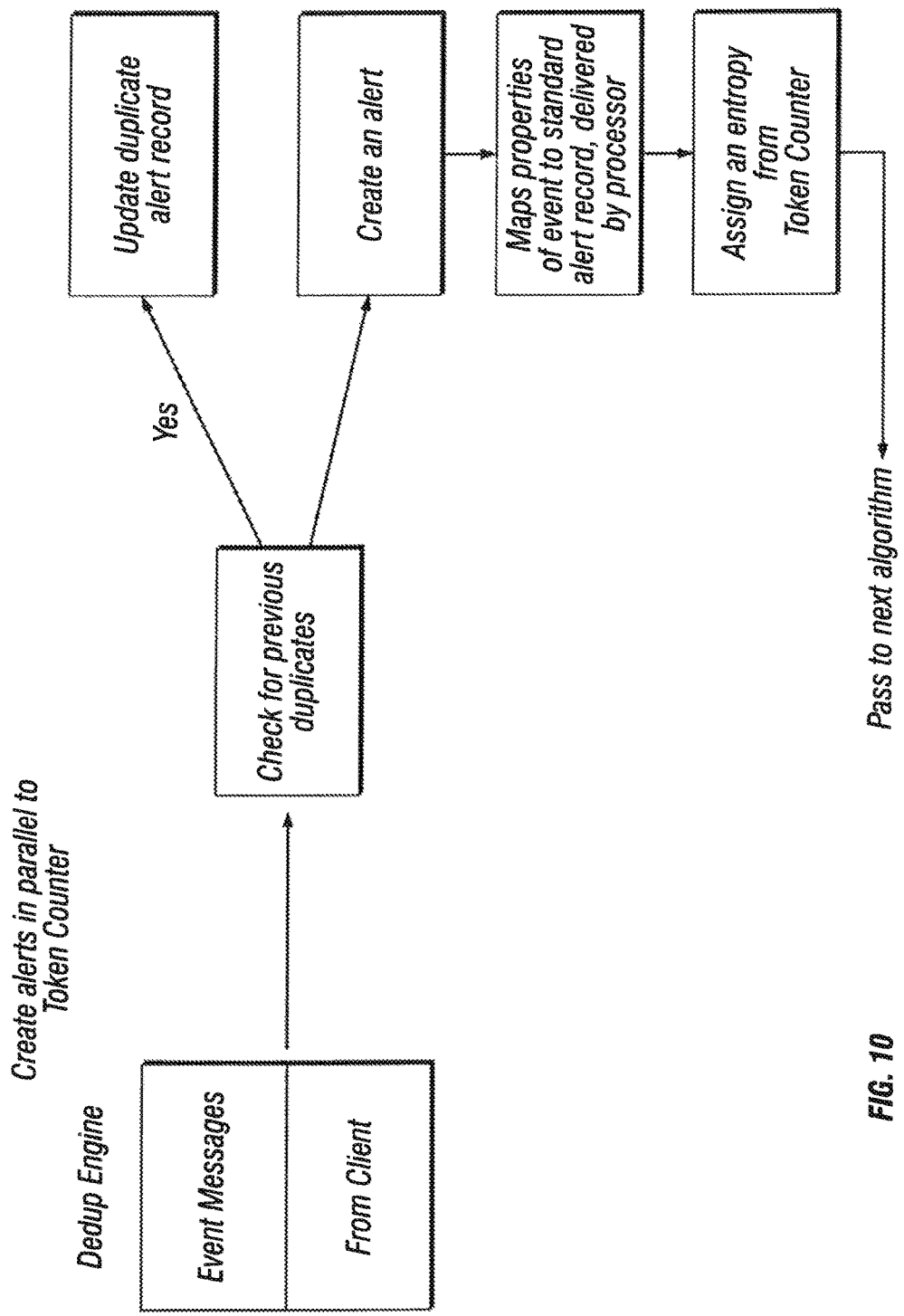
FIG. 10 illustrates one embodiment of a deduplication engine that can be used with the present invention.

In one embodiment, a deduplication engine 44 is used for event messages of data streams received from the client, FIG. 10. The deduplication engine 44 eliminates duplicate copies of repeating data. In one embodiment, the deduplication engine reduces a number of bytes in network data transfers that need to be sent.

A computer scripting language script language can be included that alters the clustering events or flow of clustering events. As non-limiting examples, the scripting language can be, Java, C, C++, C#, Objective-C, PHP, VB, Python, Pearl, Ruby, Javascript and the like.

In one embodiment, the NMF, k-means, and/or topology proximity algorithms are optionally repeated. The repeating can be performed by varying k from the previously performed common steps in the sigalizer engine 22, and optionally along with the SVD decomposition.

Optionally, generated clusters are tested against a quality function supplied by the system 10 which evaluates a cluster's uniformity. In one embodiment, the system 10 selects a best set clusters against the quality clusters.

Figure 11:
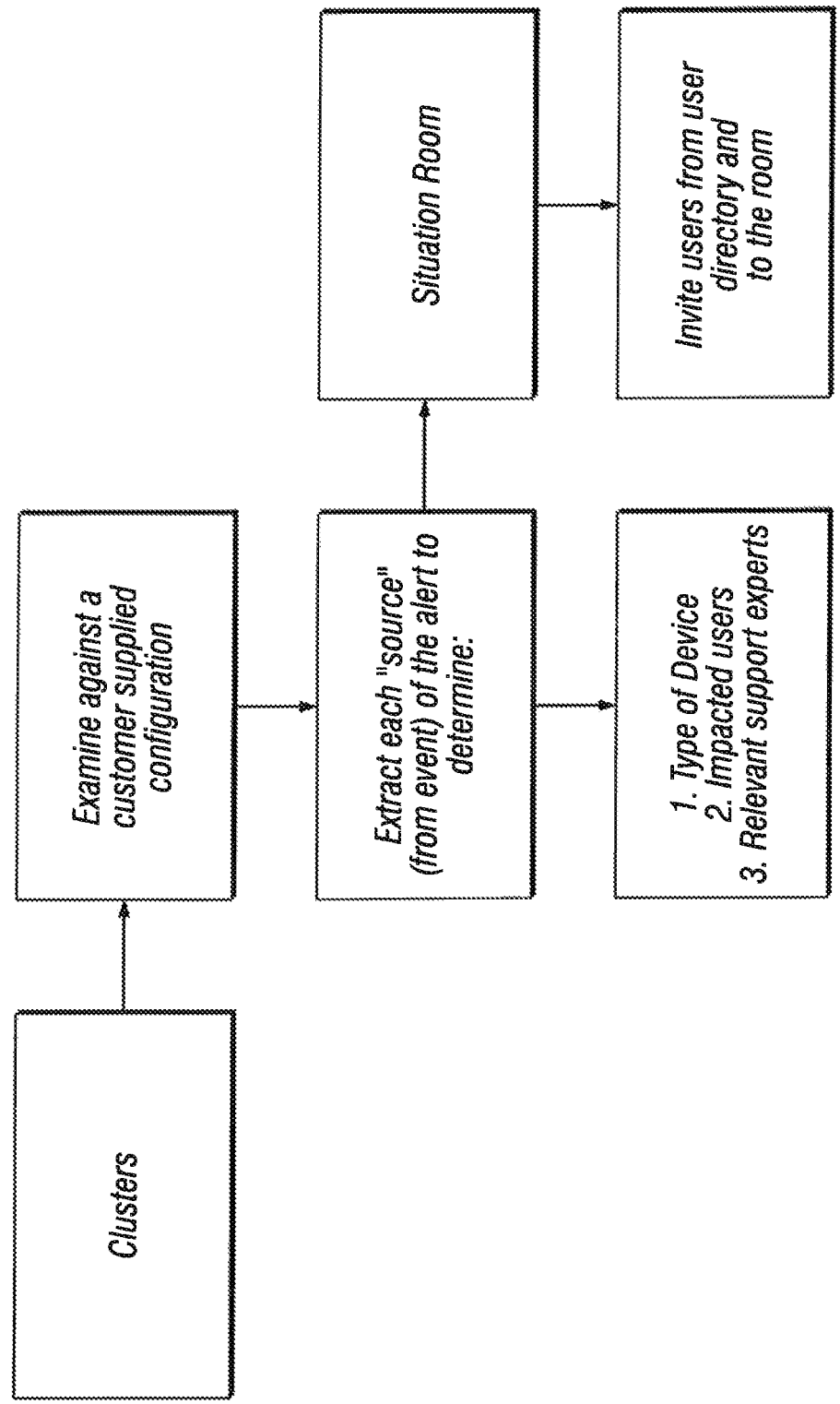
FIG. 11 illustrates one embodiment of actions that can be taken following event clustering generation.

As a non-limiting example, clusters are examiner against a customer supplied configuration database for each source of an event. As a non-limiting example, the examining can be performed to determine: a type of device; impacted users; relevant support experts, and the like, FIG. 11.

Example 1

As a non-limiting example, the NMF algorithm can be executed as follows:

Let $M_{ij}$ by a n×p non-negative matrix, (i.e., with M>0, and k>0 an integer).

Non-negative Matrix Factorization (NMF) consists in finding an approximation $$X=WH(A\ B), \quad (1)$$

where W, H are n k and k p non-negative matrices, respectively. In practice, the factorization rank r is often chosen such that r<<min(n, p) but is determined.

The main approach to NMF is to estimate matrices W and H as a local minimum: 1) M=A B A, B seed randomly tentatively adjusts A, B until the Frobenius distance ||M–A B|| is minimized where D is a loss function that measures the quality of the approximation. Common loss functions are based on either the Frobenius distance or the Kullback-Leibler divergence.

R is an optional regularization function, defined to enforce desirable properties on matrices W and H, such as smoothness or sparsity.

Example 2

As a non-limiting example, a k-means algorithm is used as follows: Given a set of event vectors $(x_1, x_2, \ldots, x_n)$, where each observation is a d-dimensional real vector, k-means clustering aims to partition the n observations into k sets (k≤n) $S=\{S_1, S_2, \ldots, S_k\}$ so as to minimize the within-cluster sum of squares (WCSS):

$$\operatorname*{argmin}_{s} \sum_{i=1}^{k} \sum_{x_j \in S_i} \|x_j - \mu_i\|^2$$

where $\mu_i$ is the mean of points in $S_i$.

In one embodiment of the situation room 18, as illustrated in FIG. 1, a system 110 is provided for creating, and displaying in a dashboard directed to the system 10 from clustering messages received from the infrastructure 14, also known as the dashboard system for the situation room 18.

In one embodiment, the situation room 18 has a display that can be interactive. The situation room 18 can be coupled to or includes a dashboard design system 112, display computer system 114, and a data system 116.

In one embodiment, the system includes dashboard converter logic 118, data range determination logic 132, dashboard component generator 122, external interface logic 124, graphic library 126, and network interface logic 128. In one embodiment, the system includes data processing computing systems.

In one embodiment, the dashboard file converter logic 118 converts the situations and alerts from system 10 from clustering messages received from the infrastructure 14 data structures and data, to be compatible with or match with the interface logic 124.

In one embodiment, the logic 118 provides communication between the graphical dashboard and the problem walls from clustering messages received from the infrastructure 14

The problem walls from clustering messages received from the infrastructure 14 are provided as disclosed above.

In one embodiment, the logic 132, dashboard component generator 122 and the external interface logic 124 are each used for designing the problem walls from clustering messages received from the infrastructure 14.

A dashboard or SWF file can be included that establishes a data range, type of components and the external interface. In one embodiment, the logic 132 is used for a data range in a spreadsheet associated with the dashboard file used to generate a visual display.

In one embodiment, a dashboard component generator 122 is provided that allows a user to place problem walls from clustering messages received from the infrastructure 14 components with various attributes onto a canvas. The canvas can be a space where various visual components are.

In one embodiment, the user is able to choose components directed to problem walls from clustering messages received from infrastructure 14 elements from a different components. These can be included in a panel and the user can then place them on the canvas in any way that the user desires.

In one embodiment, the components are provided by the client, by the system, by third parties, and from third parties. Examples of other components include but are not limited to, graphs, style of presentation, additional information, comparisons, trends, artistic elements, text, and the like. In some embodiments, the user, or client can select the background, margins, presentation of elements and the like.

In one embodiment, an external interface logic 124 is provided. The interface logic allows a dashboard to provide data ranges, permutations, trends, activities, and the like associated with problem walls from clustering messages received from the infrastructure 14. In one embodiment, interface logic 124 allows the business application software to export application data to be displayed in a dashboard in an interactive visual format.

In various embodiments, a network interface logic 128 and 130 allows for connectivity of the dashboard design system 112, display computer system 114 and data system 116 to each other, or to public networks. In one embodiment, a graphical file that has been configured by the computer system 112 is stored in the data storage system 136. In one embodiment, the graphic file is used for data mapping, both during and after design time, and can generate the display during a period of execution. The external adapter can be utilized for communication between the data storage system 136 and the graphical file.

In one embodiment, network interface logics 128 and 130 allow computer systems 112, 114 and 116 to connect to each other and the other computer systems. As a non-limiting example, the network interface logic 128 and 130 can be one or more computers or web servers that provide a graphical user interface for clients or third parties that access the subsystems of system 112, 114 or 116 through the internet or an intranet protocol. The network interface logic 128, and 130 can include other logics configured to provide interfaces for other types of devices, including but not limited to mobile devices, server-based computing systems, and the like.

As a non-limiting example, in one embodiment, the display computer system 114 includes, network interface logic 130, context viewer system 138, data storage system 136 and dashboard display system 140.

In another embodiment, the dashboard display system 140 is included in the context viewer system 138, and be executed in a machine, one or more display and other computers, with machine-readable storage media, cache, memory, flash drive or internal or external hard drive or in a cloud computing environment, non-transitory computer readable media or non-transmissible computer-readable media, with stored instructions executed by the machine to perform the operations. In one embodiment, the context viewer system 138 is a program product that performs various processing functions. As non-limiting examples, these functions can include, receiving data from the data source, preparing data by aggregating, providing access to visualization capabilities, and the like.

In one embodiment, the data storage system 136 stores data related to problem walls from clustering messages received from the infrastructure 14 applications executed on the display computer system 114.

In one embodiment, the data storage system 136 stores problem walls from clustering messages received from the infrastructure 14 data or statistical data. As a non-limiting example, the dashboard display system 140 communicates with the display computer system 114 to display problem walls from clustering messages received from infrastructure 14 data in a dashboard in a visual manner or in visual components using graphics. Displaying problem walls from clustering messages received from infrastructure 14 data graphically may include displaying bar graphs and/or pie charts or other visual displays. In order to generate the dashboard display, the client can map dashboard data fields to the problem walls from clustering messages received from infrastructure 14 data fields. This allows access of data from problem walls from clustering messages received from infrastructure 14 without data replication.

Embodiments of the data storage system 136 may store a variety of information including application data in database 130. The application data database 130 may receive data from the data system 116. The data storage system 136 may provide data to the context viewer system 138. More specifically, the data storage system 136 may provide data to the data aggregation logic 142. The data storage system 136 may receive appropriate data mapping instructions from the data mapping logic 144 and query the data system 116 to correlate the data from one mapped field in the dashboard tool to the mapped fields in the application data 146.

Embodiments of the dashboard display system 140 may be provided on the display computer system 114. In an example embodiment, the dashboard display system 140 may transfer data from various data sources or data from various applications to external data ranges of the graphic file and display the graphical interface during runtime operations. The dashboard display system 140 may include all of the features discussed above with regard to the dashboard design system 112. Also, the dashboard display system 140 also includes a dashboard execution logic 148 and external interface logic 150. The external interface logic 150 may have similar features as the external interface logic 124 of the dashboard design system 112. The external interface logic 150 may expose selected data ranges of the dashboard to the business software data. The external interface logic 150 may allow the business application software to export application data to be displayed in the dashboard in a visual format instead of a textual format. During runtime when displaying the dashboard in the business application, the dashboard execution logic 148 is configured to receive the data from the business application and generate a Flash Island interactive display as designed by the dashboard design system 112 or dashboard display system 140.

The data system 116 includes an application logic 152 and application data 146. The data system 116 may be configured to provide data and communicate with the display computer system 114. The application logic 152 is the server side of the application that provides back end information to the context viewer system 138. For example, the application logic 152 may comprise an Enterprise Resource Planning (ERP), Customer Relation Management (CRM) or Business Intelligence (BI) system. Business intelligence may refer to computer-based techniques used to analyze business data, such as sales revenue by products and/or departments or associated costs and incomes. The application data 146 may include relational or other types of databases. The application data 146 includes various fields that may be mapped to the fields exposed by the external dashboard interface.

Figure 12:
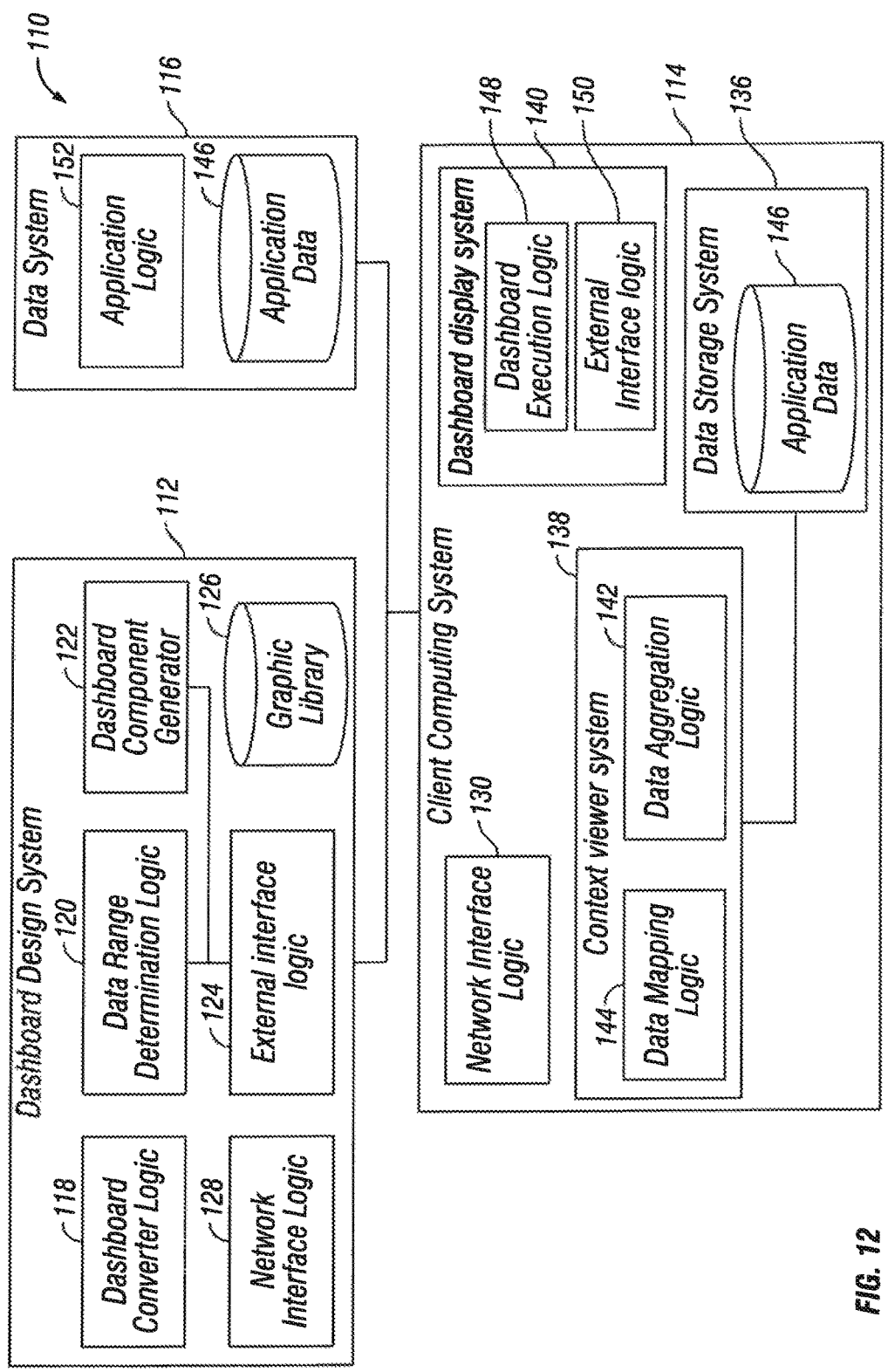
FIG. 12 is a schematic diagram of a processing system according to an embodiment.
Figure 13:
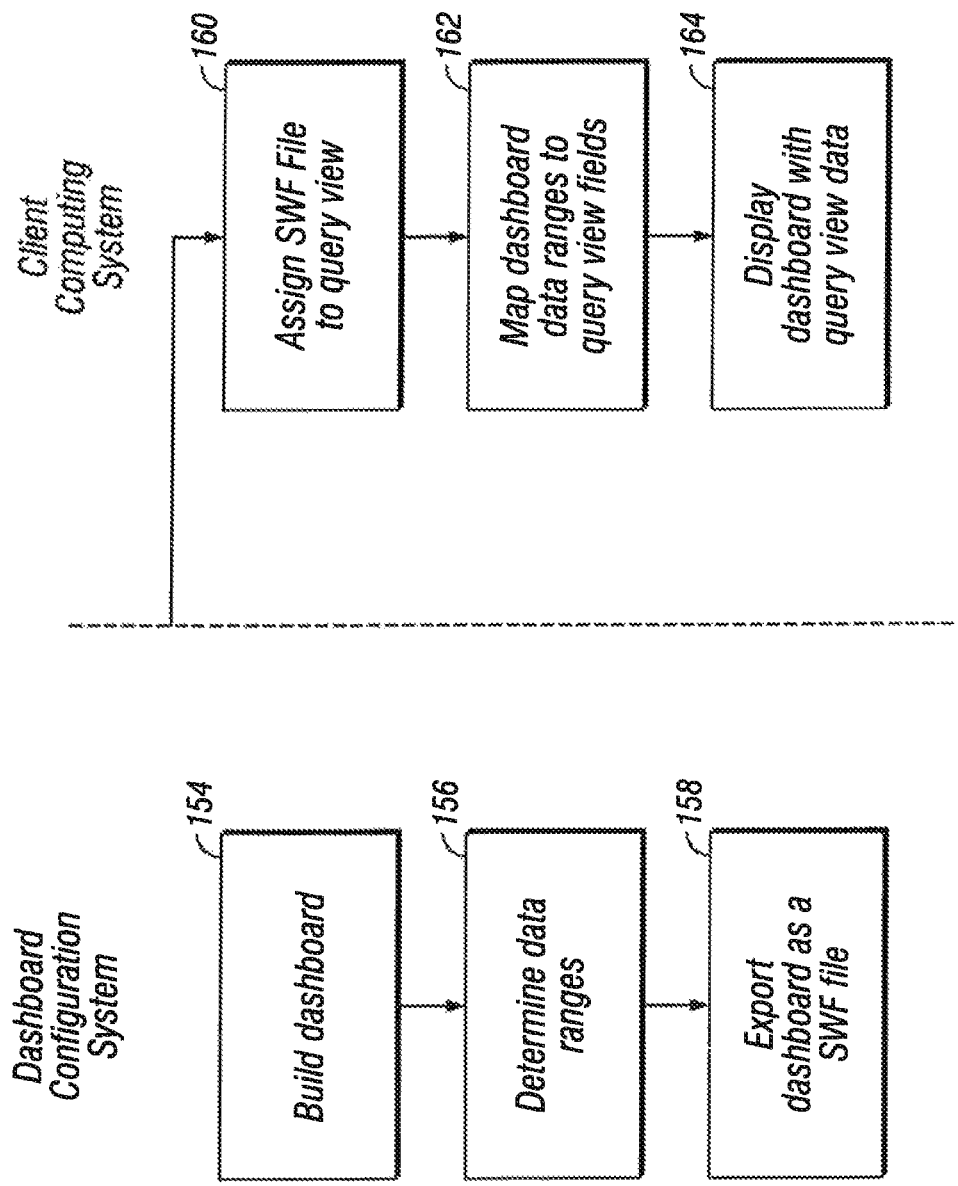
FIG. 13 is an example process that may be implemented using the systems shown in FIG. 1.

FIG. 13 is an example process that may be implemented using the system shown in FIG. 12. Initially, at step 154, in an example embodiment a dashboard design user may build a dashboard using a dashboard building software. The dashboard design user may configure the dashboard during design time. In an example embodiment, design time may include the design user configuring the dashboard layout and exposing a related data range. The dashboard design system 112 may be used to create a dashboard layout. Building the dashboard includes placing components on the canvas and configuring the properties associated with those components. As discussed above, the components may be among other components, a chart or graph. At step 156, the dashboard design user may determine and specify using a graphical user interface the data ranges for the dashboard. After creating the dashboard, at step 158, the dashboard may be exported automatically or by input from the dashboard design user to a SWF file format. Steps 154, 156 and 158 may be performed by the dashboard design user using the dashboard configuration system 112.

A business user may perform the other steps of FIG. 13 by using the display computer system 114. In an example embodiment, the business user's steps may be performed during runtime. In this embodiment, runtime includes displaying of the dashboard in a business application using data from business application data sources. In another embodiment, the business user may perform the steps described above with regard to the dashboard design user. At step 160, the business user may open the context viewer system where the business user may select a chart view 198 as shown in FIG. 17. In the chart view tab, the business user may assign the dashboard or SWF® file to a query view by specifying the location of the file. At step 162, the dashboard data ranges that were determined at step 156 may be mapped to query view fields. In an example embodiment, the data from the data source 136 (or 116) is placed in the mapped location in the dashboard. In another example embodiment, the mapping between application data and graphical interface data may identify which application data may be shown in the reserved placeholder of the dashboard. After mapping the data ranges, at step 164 the dashboard may be displayed in the business application. In one embodiment the business application may be software applications that provide various functionalities such as, customer relationship management, enterprise resource management, product lifecycle management, supply chain management and supplier relationship management. In another embodiment, the dashboard may be configured to receive data from the data system 116 after the mapping has occurred or the data may be accessed during runtime.

Figure 14:
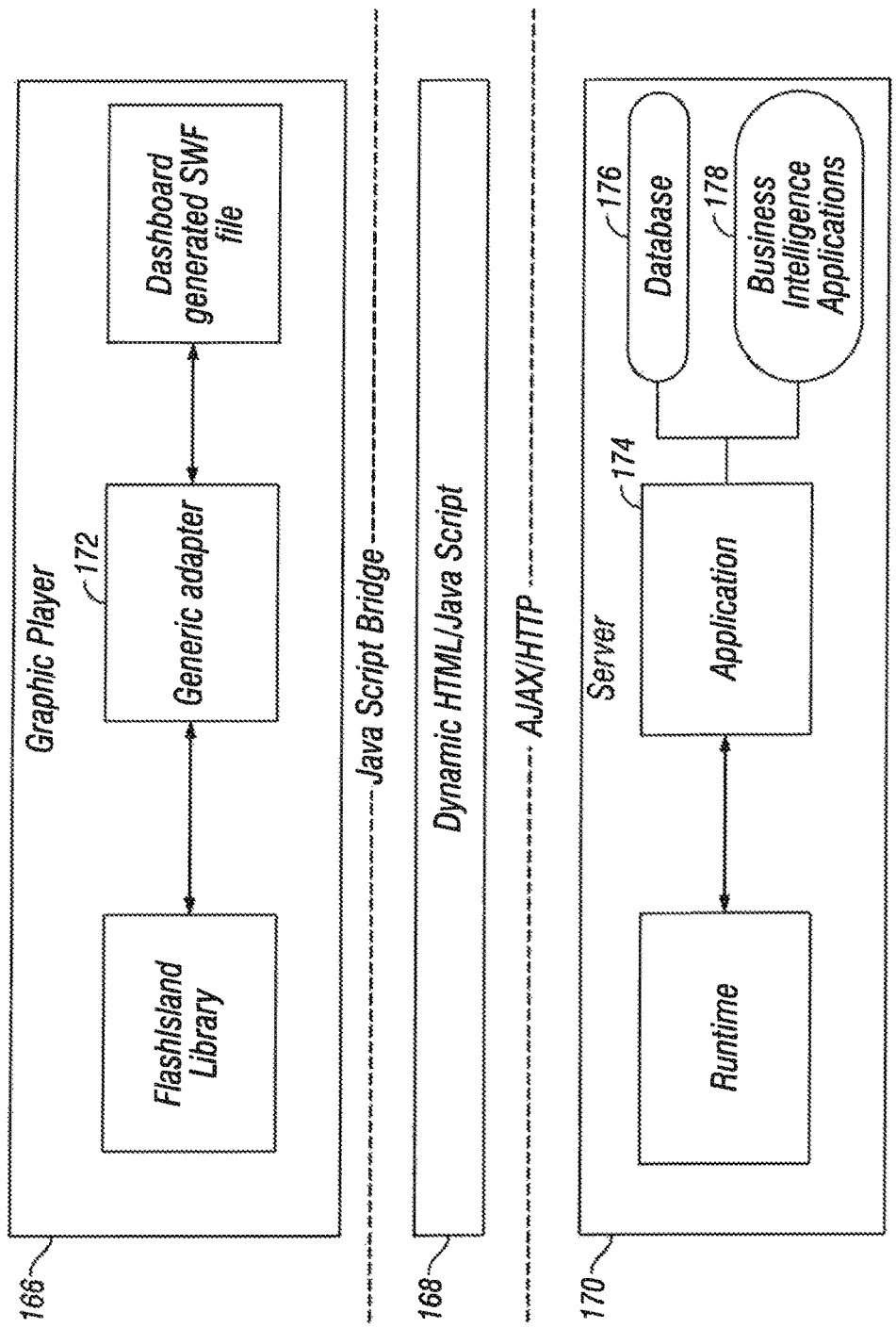
FIG. 14 is an example software architecture diagram that may be implemented using the systems shown in FIG. 1.

FIG. 14 is an example software architecture that may be implemented using the system in FIG. 12. The software architecture diagram shown in FIG. 14, shows various software layers, such as, graphic player 166, component Dynamic HTML or Java® Script 168, and Server (Java® or Java® based or other high level programming language based) 170 layers. In particular, the generic adapter 172 may be built with the Flash Island library, which may facilitate the client-side communication between HTML and JavaScript® The Dynamic HTML 168 may load the generated dashboard in a graphic file, or Flash/SWF representation. The generic adapter 172 may convert the Java® context into structures that match the dashboard's external interface format or the dashboard format. The generic adapter 172 allows the business user to generate a dashboard in a business analytic software using the most updated data from a data source without writing any customized software. The generic adapter 172 may load dashboard data ranges and convert the associated data into an XML® string that may be used for further conversion into an ABAP® string, which may be used by the business analytic software.

In another embodiment, the generic adapter 172 may convert the Flash Island properties into dashboard structures. In an example embodiment, the generic adapter 172 may be used to load external dashboard ranges during the configuration stage, at step 162. In this embodiment, the generic adapter 172 may push application data to the data ranges defined in step 162. In another embodiment, the generic adapter 172 may provide an application programming interface between the graphic player 166 and the server 170. The generic adapter 172 may load dashboard ranges automatically and the dashboard data ranges may be converted into XML strings. The XML string may be converted into Java® or ABAP® code which may be executed by the business application 174, to display a dashboard. The server 170 may include NetWeaver®, ABAP® or Java® language programming and the server may include various systems that are supported in the business software suit, the runtime 382, application 174, database 176 and business intelligence application 178. In another embodiment, the functionality of the server 170 may be implemented by the display computing system 114. In yet another embodiment the functionality of server 170 may be divided between the display computing system 114 and data system 116. In another embodiment, the graphic player 166 may be implemented on the dashboard design system 112. Additionally or alternatively, the functionality of the graphic player 166 may be implemented on the display computing system 114.

Figure 15:
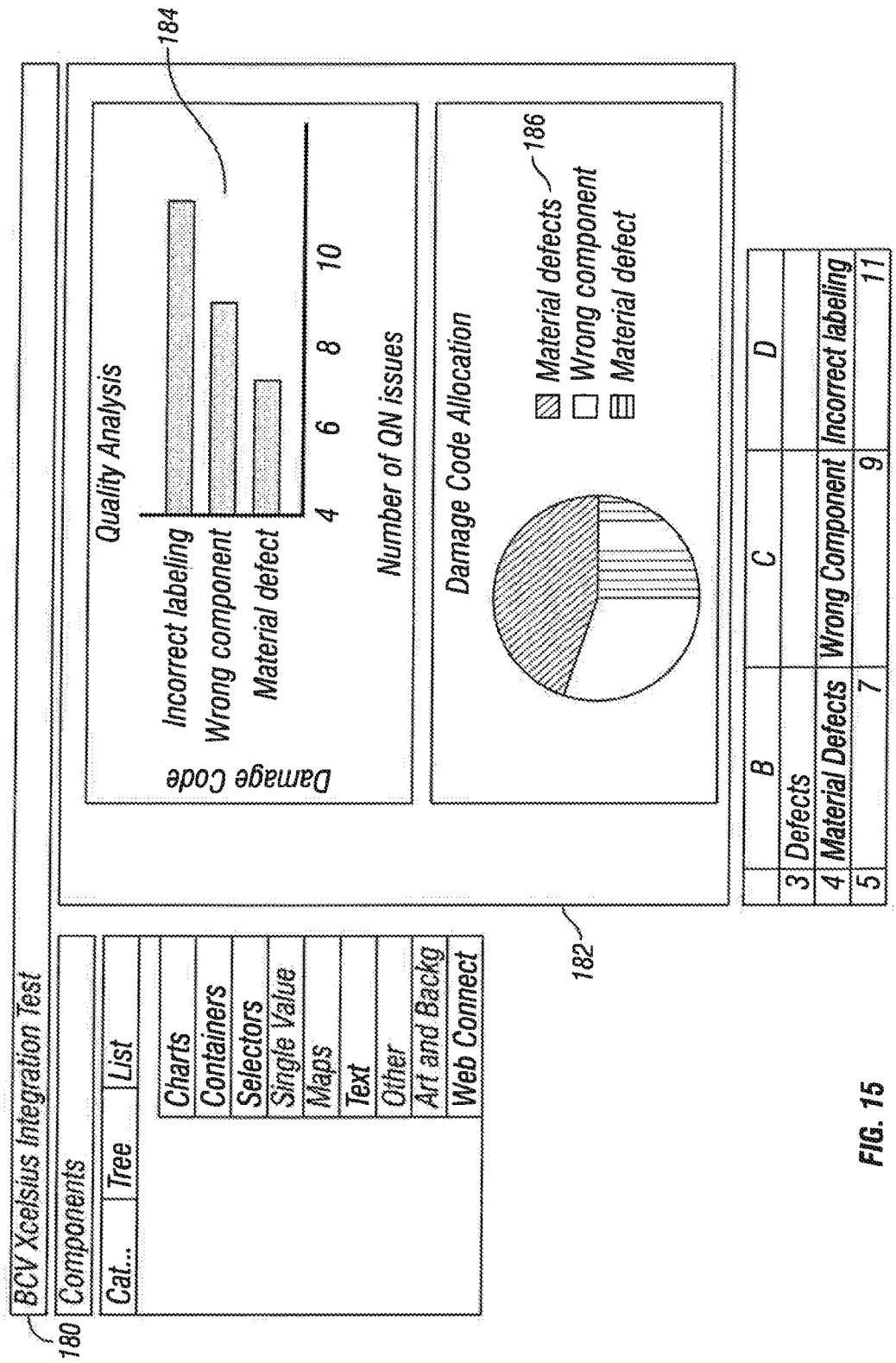
FIG. 15 is a screen display of a dashboard display system that may be used to configure a dashboard.

FIG. 15 shows a screen display 180 of the dashboard designer that may be used to design a dashboard display according to the system shown in FIG. 12. The dashboard designer may be executed by the dashboard design system 112. The dashboard may be created on the canvas 182. A dashboard design user may place the components from the component panel on the canvas 182. As shown in FIG. 15, the canvas 182 has a bar graph 184 and a pie chart 186 that are displayed in this example dashboard. The dashboard 180 shown in FIG. 15 is using example data from the spreadsheet shown at the bottom of FIG. 15. For example, the labels of the bar graph "Incorrect labeling", "Wrong component" and "Material defects" are from the spreadsheet shown below. In particular, the cell range from B4 to D5 440 was selected as input into the properties of the bar graph and the pie chart. Next, the data in the bar graph and the pie chart is received from cell range B5 to D5. In order to generate this dashboard the dashboard design user may associate various data fields with particular component properties.

Figure 16:
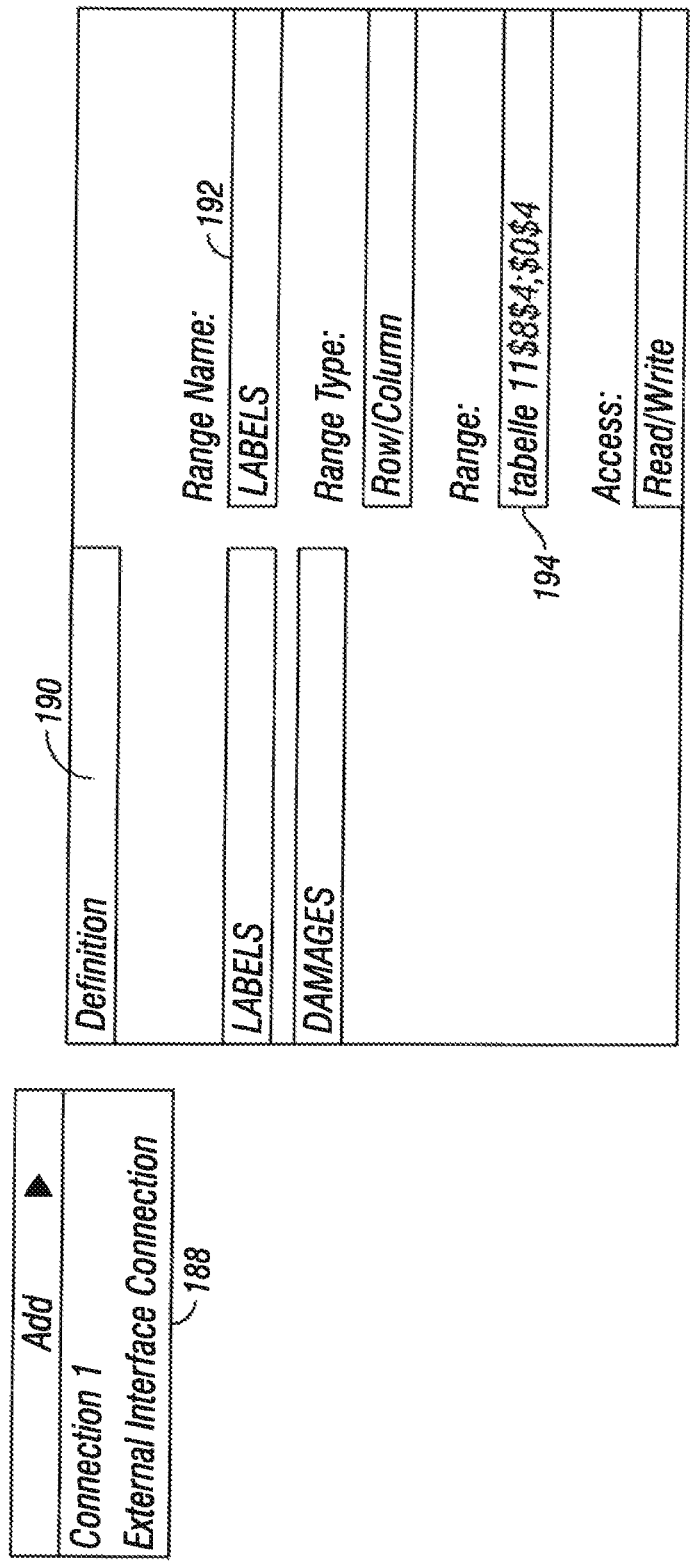
FIG. 16 is a screen display of the dashboard external interface screen that may allow another software program to transmit data in the data range.

FIG. 16 is a screen display of the dashboard external interface that can permit another software program to access the dashboard controls and display. The external interface connection 188 may allow data from the application system to be passed to a cell range of the dashboard or SWF file, using push technology. During the execution of the dashboard or runtime, data may be pushed or sent from the data source, based on the mapping, to the dashboard. In this embodiment, the data may be transferred in tabular form across an interface. In another embodiment the external interface connection 188 may allow the use of pull technology, where the data is pulled by the context viewer system 138. In another embodiment, during the configuration of the dashboard when the "Generate XC Fields" button is clicked, the defined data ranges will be pulled to the system 150, for example in FIG. 16. The external interface connection 188 may be configured using a definition tab 190, range name 192, range type, range 194 and access type properties. External interface connections allow a dashboard design user to expose selected data ranges relating to the dashboard display. The range name 192 in FIG. 16 is shown as Labels and the range 194 being assigned, "Table 1 !$B$4:$D$4" which is the cell range from B4 to D4. In this example embodiment, the labels from B4 to D4 will be used for mapping the Labels field. After specifying the data range, the dashboard design user may export the dashboard as a file, the file may be executed by various software program including business software.

FIG. 17 is a screen display that allows a user to choose a chart view in order to display a dashboard. In particular, the query view 196 is part of the context viewer application and includes various data types from a business analytics database. If the user chooses to view a chart, the user may select the chart view 198. After a user selects the chart view 198 then the user may be presented with a screen shown in FIG. 18.

Figure 18:
FIG. 18 is an example screen display showing the data mapping feature of the dashboard configuration screen.

FIG. 18 is an example screen display showing the data mapping for the dashboard configuration screen. Screen 210 shows a user interface where the user may select (using a pull down menu) the type of technology 212 the user plans to use for the chart view display. Here, the user may select the type of dashboard file that was created as the technology. Next, the file path 214 of the exported dashboard or SWF file may be specified. After choosing a SWF file, the user may select the "Upload file to repository" button 730 in order to save a graphic file (SWF file) in the system 138. After selecting button 740 "Generate XC Fields", may be the name of the dashboard external data ranges (e.g. "Damages" and "Labels" in FIG. 16). In the mapping shown in FIG. 18, the user may enter or browse for the name of data source (Query ID). For example, the Query ID shown in this example is "ZOK_QN". This entry is mapped against the data source that may be stored in the application data 146. The user may search for the Query Field ID, which is a specific field of data source Query ID (e.g. field "CODE TEXT" of Query ID "ZOK_QN" in the provided example). Creating this mapping allows the dashboard to utilize the data in the application data 146 or 130. As can be appreciated that programming in a textual or visual manner is not required and the user may create the dashboard, export the dashboard, map the fields and display the dashboard as shown in FIG. 19 using a graphical user interface that responds to a pointing device (e.g. mouse, pen or display device that is sensitive to touch or ocular movement).

Figure 19:
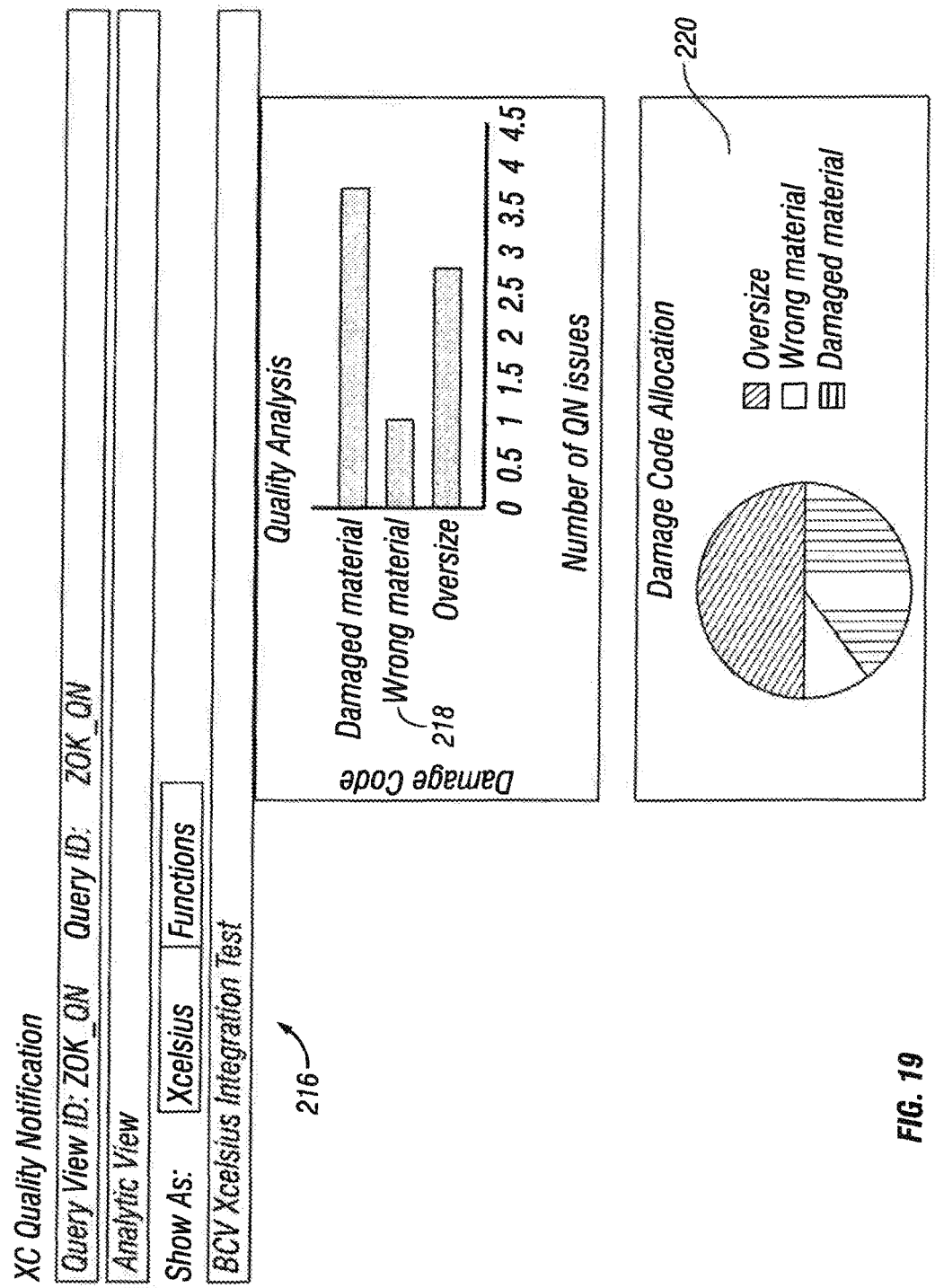
FIG. 19 is an example screen display showing the graphical display of the data using the dashboard configuration shown in FIGS. 4-7.

FIG. 19 is an example screen display showing the graphical display of the data using the dashboard configuration from FIGS. 15-18. FIG. 19 shows a dashboard 216 that includes the bar graph 218 and pie chart 220. The labels and the value data in the bar and the pie charts 218 and 220 are from the business software and are different than the data used in FIG. 15. Therefore, the user can create a display of a dashboard in another application by using an external connection that may expose data fields to permit the visualization of any type of data.

The embodiments refer to a dashboard that may be a web-based or other technology based display on which real time data is collated, processed and displayed from multiple data sources that belong to one or more businesses. Other terms that may be used to describe a dashboard, include, digital dashboard, enterprise dashboard, business dashboard, executive dashboard, operational dashboard, BI dashboard, database dashboard, Web dashboard, performance dashboard, score card, KPI dashboard, metrics dashboard and so on. Dashboards may be designed to help any user monitor what's happening or has happened in the past visually or at a glance. Dashboards may provide the user a means to rapidly monitor the current status. Accordingly, dashboards must be designed to take advantage of the strengths of visual perception, cognition and work around or augment the user's weaknesses.

Embodiments can include a system for displaying data stored on computer readable non-transitory media. The system configured to access one or more data fields within a file. The file having been configured using an external connection adapter. The system may include a display computer system configured to map the accessed one or more data fields to data from one or more data sources, the mapping being performed based on a user input via a graphical user interface. In this embodiment, the system may be configured to display on the display computer system a dashboard according to the configuration setting stored in the file, the dashboard may show a graphical representation of the data from the one or more data sources and information from the one or more data fields.

In another embodiment, the dashboard includes dashboard display system that processes the data from the one or more data sources and displays a visual representation of the data in a graph or chart form. Alternatively or additionally, the dashboard includes a component that is modified by using a graphical user interface such that the dashboard display or components are modified.

In another embodiment, the file is generated by a first software program located in the dashboard design system that is configured to generate the dashboard. The display computing system may further comprise executing a second software program on the display computer system to retrieve the data from the one or more data sources and displaying the dashboard. The display computing system may include converting, using a generic adapter, the data from the one or more data sources into data structures that are compatible with a format of the graphic file.

In another embodiment the data is converted from the one or more data sources into data structures that are compatible with a format of the file using the external connection adapter. The file can be a short web format file that exposes one or more data fields that may be mapped to fields in one or more data sources. In another embodiment, the mapping may occur via a graphical user interface free of receiving textual programming code from the user.

In another embodiment, a computer-implemented method is stored on a computer readable media. Visualization software is integrated with a data processing application that includes configuring a dashboard display using a dashboard design system. The dashboard display can use one or more first data ranges from a spreadsheet as example data. An external connection adapter can be used to provide access to one or more first data ranges that are to be displayed in the dashboard display.

In other embodiments, the dashboard display is exported in a graphic file format. In certain embodiments, one or more first data ranges are accessed from the dashboard display using a display computing system. In one embodiment, one or more first data ranges are connected to one or more second data ranges from one or more data sources. The dashboard can display using data from the one or more second data ranges.

In one embodiment, the dashboard displays with the problem walls from clustering messages received from infrastructure 14 data can use a graphical user interface that is free from receiving textual or textual programming code from the client. In this embodiment the method may include processing place problem walls from clustering messages received from managed infrastructure 14 from the one or more data sources and displaying a visual representation of the data in a graph or chart form. This can include a method that includes a component that may be modified by using a graphical user interface that results in a modification of the dashboard display.

In one embodiment, a method is provided that includes a dashboard display generated by a first software program that generates a visual display. This can include, executing a second software program on the display computer system to retrieve the data from the one or more data sources and displaying the dashboard and the method may include converting, using a generic adapter, the data from the one or more data sources into data structures that are compatible with a format of the file.

In one embodiment, the exporting can include converting the place problem walls from clustering messages received from infrastructure 14 data from the one or more second data sources into data structures that are compatible with the graphic file format. In one embodiment, this can include converting using an external interface adapter. A graphic file format can be a short web format that allows a software to access the one or more first data ranges.

In another embodiment, a user interface system has an external connection adapter configured to provide access to one or more data fields within a file. As a non-limiting example, this can include a display computer system that maps using a graphical user interface the one or more data fields to data from one or more data sources. The display computer system can generate a dashboard display from a configuration in the file. In one embodiment, the display includes place problem walls from clustering messages received from infrastructure 14 data from one or more data sources and information from one or more data fields. A graphical user interface can be provided that is free of receiving textual programming code from the user.

In one embodiment, a first software executed on a display computer system that generates the dashboard in a visual graphic display. A second software program can be included to execute on the display computer system and retrieve the data from the one or more data sources and display the dashboard display. A generic adapter can be utilized to convert the data from the one or more data sources into one or more data structures that are compatible with a format of the file.

In one embodiment, a graphical user interface can modify a component and this can be used to modify the dashboard display.

In one embodiment, an external connection adapter converts the data from the one or more data sources into data structures that are compatible with a format of the file using the external connection adapter.

The logics can be machine-readable media for carrying or have machine-executable instructions or data structures stored thereon. The machine-readable media can be any available media that may be accessed by a general purpose or special purpose computer or other machine with a processor. As a non-limiting example, a variety of machine-readable media can be utilized, including but not limited to: RAM, ROM, EPROM, EEPROM, CD-ROM or other optical disk storage, magnetic disk storage or other magnetic storage devices, non-transitory computer readable media or non-transmissible computer-readable media or any other medium which may be used to carry or store desired program code in the form of machine-executable instructions or data structures and which may be accessed by a general purpose or special purpose computer or other machine with a processor. With the dashboard system, any such type of connection is termed a machine-readable medium. It will be appreciated that the machine-readable medium can include combinations of the preceding.

As non-limiting examples, with the dashboard system, machine-executable instructions can be: instructions and data which cause a general purpose computer, special purpose computer, or special purpose processing machines to perform a certain function or group of functions, and the like.

The dashboard system can be implemented by a program product including machine-executable instructions, such as program code. As a non-limiting example, this can be program modules executed by machines in networked environments. As non-limiting examples, the program modules can include routines, programs, objects, components, data structures, and the like, that perform particular tasks or implement particular abstract data types. As non-limiting examples the dashboard system can utilize, machine-executable instructions, associated data structures, and program modules as program code for executing steps of the methods disclosed herein.

As non-limiting examples, the dashboard system can be executed in a networked environment using logical connections to one or more remote computers having processors. AS non-limiting examples, suitable network computing environments can be, computers, including personal computers, mobile devices, multi-processor systems, microprocessor-based or programmable consumer electronics, network PCs, minicomputers, mainframe computers, and the like.

In certain embodiments, the dashboard system can be executed in distributed computing environments where tasks are performed by local and remote processing devices that are linked. As non-limiting examples, the linking can be by, hardwired links, wireless links, combination of hardwired or wireless links, and the like, through a communications network. In one embodiment, computing environment, program modules may be located in both local and remote memory storage devices.

As a non-limiting example, one embodiment of a system for implementing the overall system or portions of the embodiments can include a general purpose computing computers in the form of computers, including a processing unit, a system memory or database, and a system bus that couples various system components including the system memory to the processing unit. The database or system memory cam include read only memory (ROM) and random access memory (RAM).

As a non-limiting example, the database can be a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media, and the like.

As a non-limiting example, the drives and their associated machine-readable media can be used to provide nonvolatile storage of machine-executable instructions, data structures, program modules and other data for the computer. It should also be noted that the word "terminal" as used herein is intended to encompass computer input and output devices. User interfaces, as described herein may include a computer with monitor, keyboard, a keypad, a mouse, joystick or other input devices performing a similar function.

Figure 20:
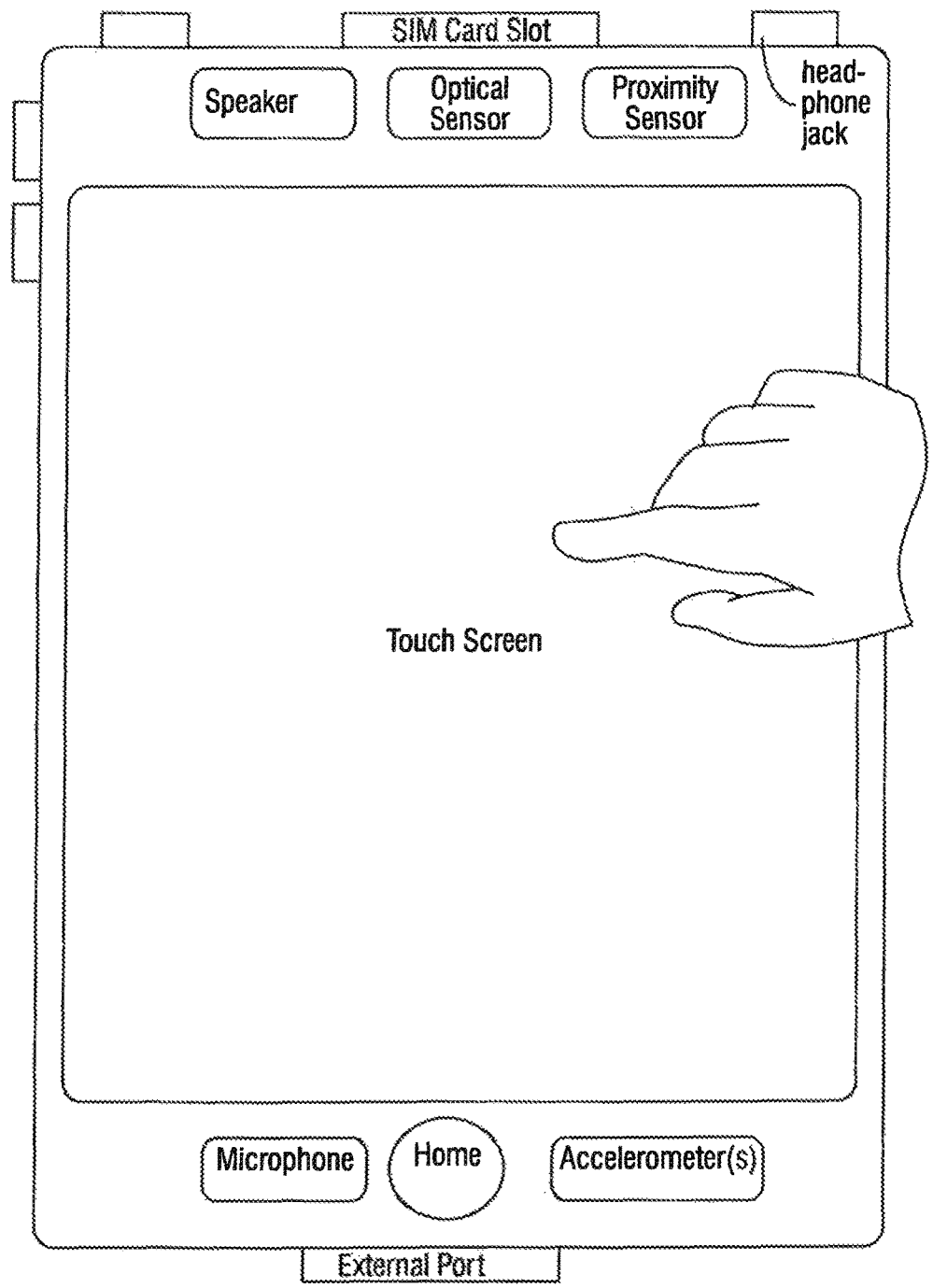
FIGS. 20 through 22 illustrate one embodiment of a mobile device infrastructure that can be used with the clustering system of the present invention.
Figure 21:
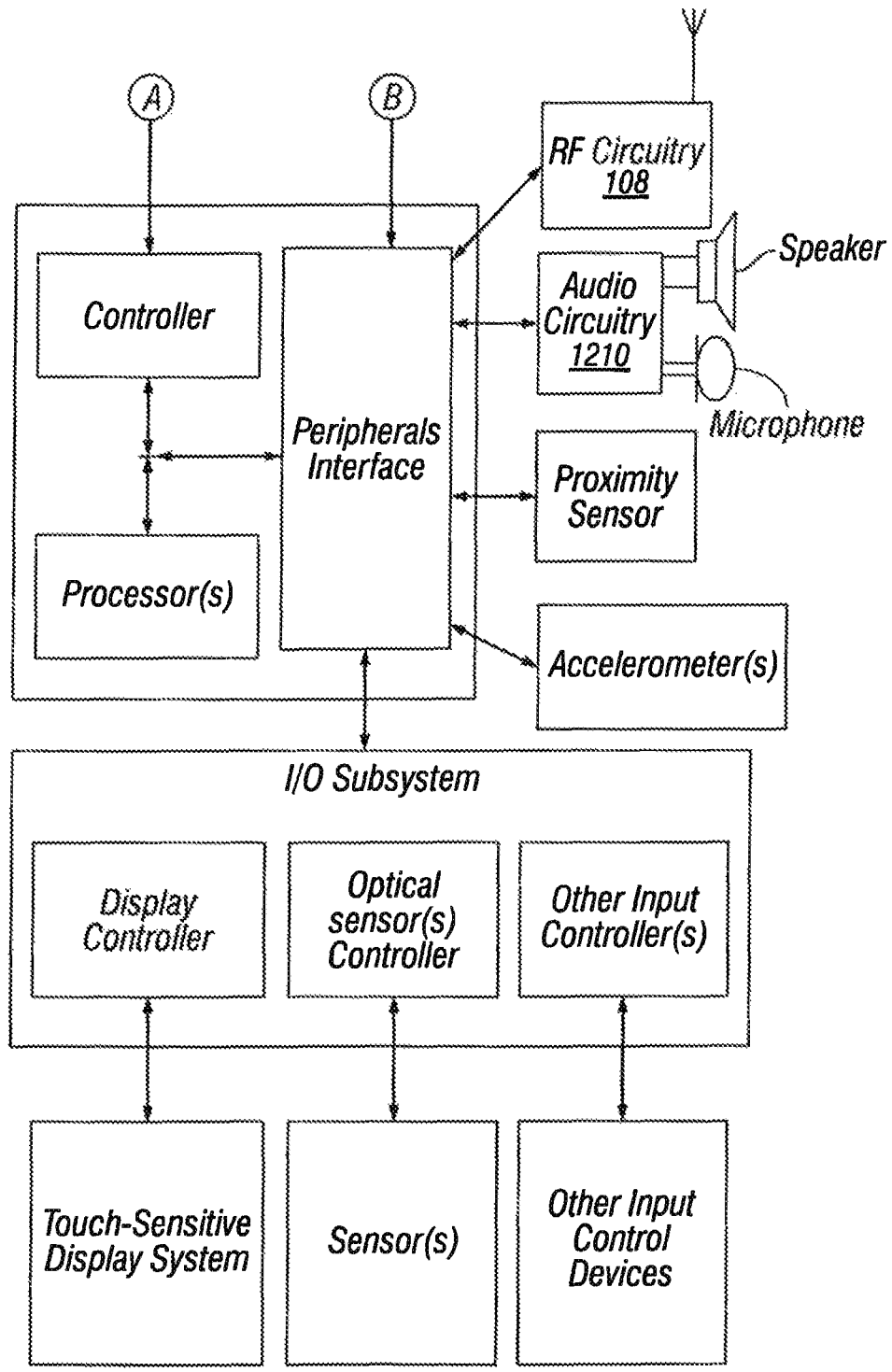
Figure 22:
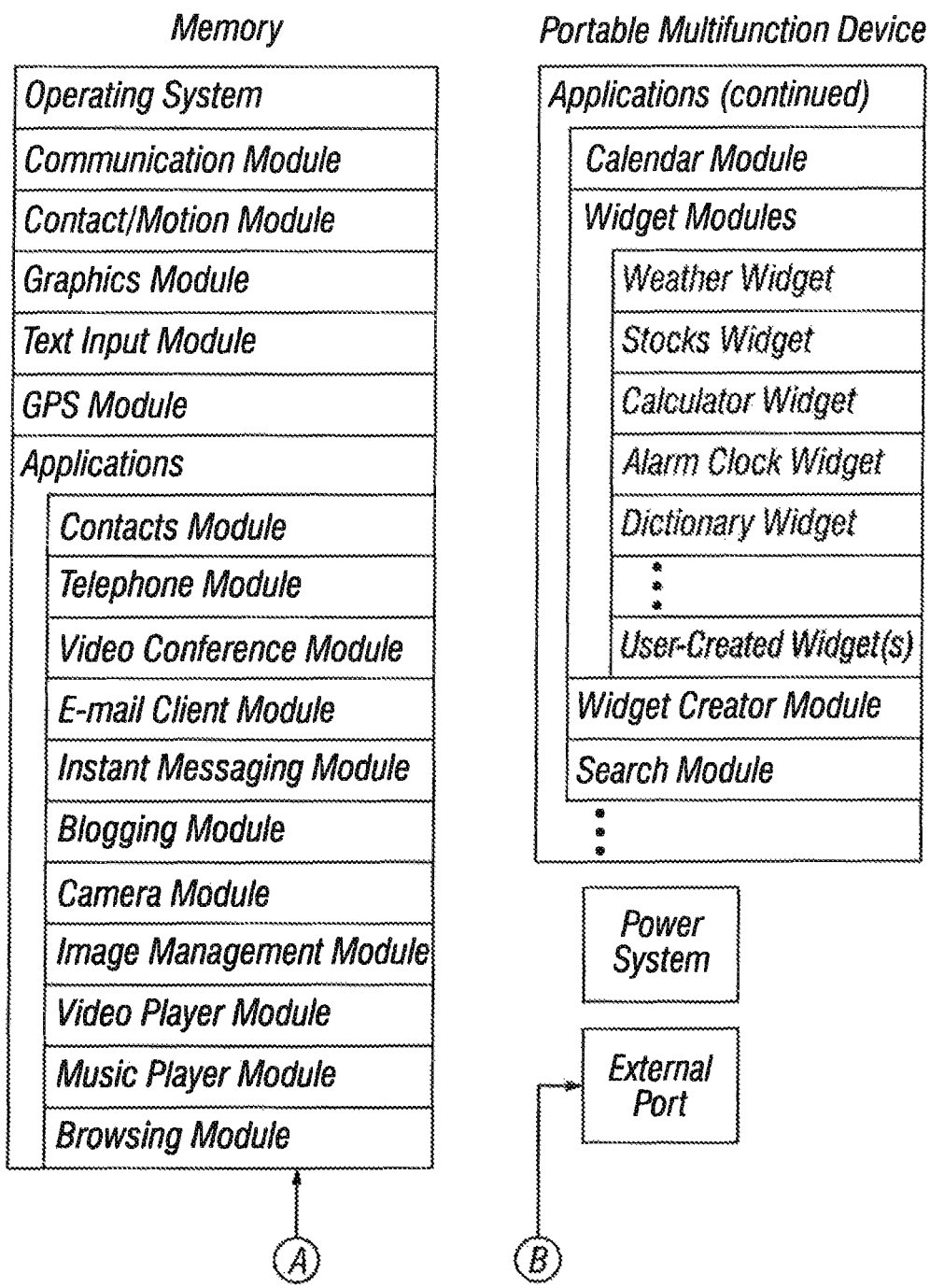

Referring now to FIGS. 20 through 22, diagrams are provided illustrating embodiments of a mobile or computing device that can be used as infrastructure 14 with system 10.

Referring to FIGS. 20-22, the mobile or computing device can include a display that can be a touch sensitive display. The touch-sensitive display is sometimes called a "touch screen" for convenience, and may also be known as or called a touch-sensitive display system. The mobile or computing device may include a memory (which may include one or more computer readable storage mediums), a memory controller, one or more processing units (CPU's), a peripherals interface, Network Systems circuitry, including but not limited to RF circuitry, audio circuitry, a speaker, a microphone, an input/output (I/O) subsystem, other input or control devices, and an external port. The mobile or computing device may include one or more optical sensors. These components may communicate over one or more communication buses or signal lines.

It should be appreciated that the mobile or computing device is only one example of a portable multifunction mobile or computing device, and that the mobile or computing device may have more or fewer components than shown, may combine two or more components, or a may have a different configuration or arrangement of the components. The various components shown in FIG. 21 may be implemented in hardware, software or a combination of hardware and software, including one or more signal processing and/or application specific integrated circuits.

Memory may include high-speed random access memory and may also include non-volatile memory, such as one or more magnetic disk storage devices, flash memory devices, or other non-volatile solid-state memory devices. Access to memory by other components of the mobile or computing device, such as the CPU and the peripherals interface, may be controlled by the memory controller.

The peripherals interface couples the input and output peripherals of the device to the CPU and memory. The one or more processors run or execute various software programs and/or sets of instructions stored in memory to perform various functions for the mobile or computing device and to process data.

In some embodiments, the peripherals interface, the CPU, and the memory controller may be implemented on a single chip, such as a chip. In some other embodiments, they may be implemented on separate chips.

The Network System circuitry receives and sends signals, including but not limited to RF, also called electromagnetic signals. The Network System circuitry converts electrical signals to/from electromagnetic signals and communicates with communications networks and other communications devices via the electromagnetic signals. The Network Systems circuitry may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The Network Systems circuitry may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication.

The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), BLUETOOTH®, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

The audio circuitry, the speaker, and the microphone provide an audio interface between a user and the mobile or computing device. The audio circuitry receives audio data from the peripherals interface, converts the audio data to an electrical signal, and transmits the electrical signal to the speaker. The speaker converts the electrical signal to human-audible sound waves. The audio circuitry also receives electrical signals converted by the microphone from sound waves. The audio circuitry converts the electrical signal to audio data and transmits the audio data to the peripherals interface for processing. Audio data may be retrieved from and/or transmitted to memory and/or the Network Systems circuitry by the peripherals interface. In some embodiments, the audio circuitry also includes a headset jack (FIG. 20). The headset jack provides an interface between the audio circuitry and removable audio input/output peripherals, such as output-only headphones or a headset with both output (e.g., a headphone for one or both ears) and input (e.g., a microphone).

The I/O subsystem couples input/output peripherals on the mobile or computing device, such as the touch screen and other input/control devices, to the peripherals interface. The I/O subsystem may include a display controller and one or more input controllers for other input or control devices. The one or more input controllers 1 receive/send electrical signals from/to other input or control devices. The other input/control devices may include physical buttons (e.g., push buttons, rocker buttons, etc.), dials, slider switches, and joysticks, click wheels, and so forth. In some alternate embodiments, input controller(s) may be coupled to any (or none) of the following: a keyboard, infrared port, USB port, and a pointer device such as a mouse. The one or more buttons may include an up/down button for volume control of the speaker and/or the microphone. The one or more buttons may include a push button. A quick press of the push button may disengage a lock of the touch screen or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button may turn power to the mobile or computing device on or off. The user may be able to customize a functionality of one or more of the buttons. The touch screen is used to implement virtual or soft buttons and one or more soft keyboards.

The touch-sensitive touch screen provides an input interface and an output interface between the device and a user. The display controller receives and/or sends electrical signals from/to the touch screen. The touch screen displays visual output to the user. The visual output may include graphics, text, icons, video, and any combination thereof (collectively termed "graphics"). In some embodiments, some or all of the visual output may correspond to user-interface objects, further details of which are described below.

A touch screen has a touch-sensitive surface, sensor or set of sensors that accepts input from the user based on haptic and/or tactile contact. The touch screen and the display controller (along with any associated modules and/or sets of instructions in memory) detect contact (and any movement or breaking of the contact) on the touch screen and converts the detected contact into interaction with user-interface objects (e.g., one or more soft keys, icons, web pages or images) that are displayed on the touch screen. In an exemplary embodiment, a point of contact between a touch screen and the user corresponds to a finger of the user.

The touch screen may use LCD (liquid crystal display) technology, or LPD (light emitting polymer display) technology, although other display technologies may be used in other embodiments. The touch screen and the display controller may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen.

A touch-sensitive display in some embodiments of the touch screen may be analogous to the multi-touch sensitive tablets described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in their entirety. However, a touch screen displays visual output from the portable mobile or computing device, whereas touch sensitive tablets do not provide visual output.

A touch-sensitive display in some embodiments of the touch screen may be as described in the following applications: (1) U.S. patent application Ser. No. 11/381,313, "Multipoint Touch Surface Controller," filed May 12, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

The touch screen may have a resolution in excess of 1000 dpi. In an exemplary embodiment, the touch screen has a resolution of approximately 1060 dpi. The user may make contact with the touch screen using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, the mobile or computing device may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen or an extension of the touch-sensitive surface formed by the touch screen.

In some embodiments, the mobile or computing device may include a physical or virtual click wheel as an input control device. A user may navigate among and interact with one or more graphical objects (henceforth referred to as icons) displayed in the touch screen by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller as well as one or more of the modules and/or sets of instructions in memory. For a virtual click wheel, the click wheel and click wheel controller may be part of the touch screen and the display controller, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

The mobile or computing device also includes a power system for powering the various components. The power system may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The mobile or computing device may also include one or more sensors, including not limited to optical sensors. FIG. 30 illustrates how an optical sensor coupled to an optical sensor controller in I/O subsystem. The optical sensor may include charge-coupled device (CCD) or complementary metal-oxide semiconductor (CMOS) phototransistors. The optical sensor receives light from the environment, projected through one or more lens, and converts the light to data representing an image. In conjunction with an imaging module 58 (also called a camera module); the optical sensor may capture still images or video. In some embodiments, an optical sensor is located on the back of the mobile or computing device, opposite the touch screen display on the front of the device, so that the touch screen display may be used as a viewfinder for either still and/or video image acquisition. In some embodiments, an optical sensor is located on the front of the device so that the user's image may be obtained for videoconferencing while the user views the other video conference participants on the touch screen display. In some embodiments, the position of the optical sensor can be changed by the user (e.g., by rotating the lens and the sensor in the device housing) so that a single optical sensor may be used along with the touch screen display for both video conferencing and still and/or video image acquisition.

The mobile or computing device may also include one or more proximity sensors. In one embodiment, the proximity sensor is coupled to the peripherals interface. Alternately, the proximity sensor may be coupled to an input controller in the I/O subsystem. The proximity sensor may perform as described in U.S. patent application Ser. No. 11/241,839, "Proximity Detector In Handheld Device," filed Sep. 30, 2005; Ser. No. 11/240,788, "Proximity Detector In Handheld Device," filed Sep. 30, 2005; Ser. No. 13/096,386, "Using Ambient Light Sensor To Augment Proximity Sensor Output"; Ser. No. 13/096,386, "Automated Response To And Sensing Of User Activity In Portable Devices," filed Oct. 24, 2006; and Ser. No. 11/638,251, "Methods And Systems For Automatic Configuration Of Peripherals," which are hereby incorporated by reference in their entirety. In some embodiments, the proximity sensor turns off and disables the touch screen when the multifunction device is placed near the user's ear (e.g., when the user is making a phone call). In some embodiments, the proximity sensor keeps the screen off when the device is in the user's pocket, purse, or other dark area to prevent unnecessary battery drainage when the device is a locked state.

In some embodiments, the software components stored in memory may include an operating system, a communication module (or set of instructions), a contact/motion module (or set of instructions), a graphics module (or set of instructions), a text input module (or set of instructions), a Global Positioning System (GPS) module (or set of instructions), and applications (or set of instructions).

The operating system (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module facilitates communication with other devices over one or more external ports and also includes various software components for handling data received by the Network Systems circuitry and/or the external port. The external port (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Computer, Inc.) devices.

The contact/motion module may detect contact with the touch screen (in conjunction with the display controller) and other touch sensitive devices (e.g., a touchpad or physical click wheel). The contact/motion module includes various software components for performing various operations related to detection of contact, such as determining if contact has occurred, determining if there is movement of the contact and tracking the movement across the touch screen, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module and the display controller also detect contact on a touchpad. In some embodiments, the contact/motion module and the controller detects contact on a click wheel.

Examples of other applications that may be stored in memory include other word processing applications, JAVA-enabled applications, encryption, digital rights management, voice recognition, and voice replication.

In conjunction with touch screen, display controller, contact module, graphics module, and text input module, a contacts module may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone, video conference, e-mail, or IM; and so forth.

Figure 23:
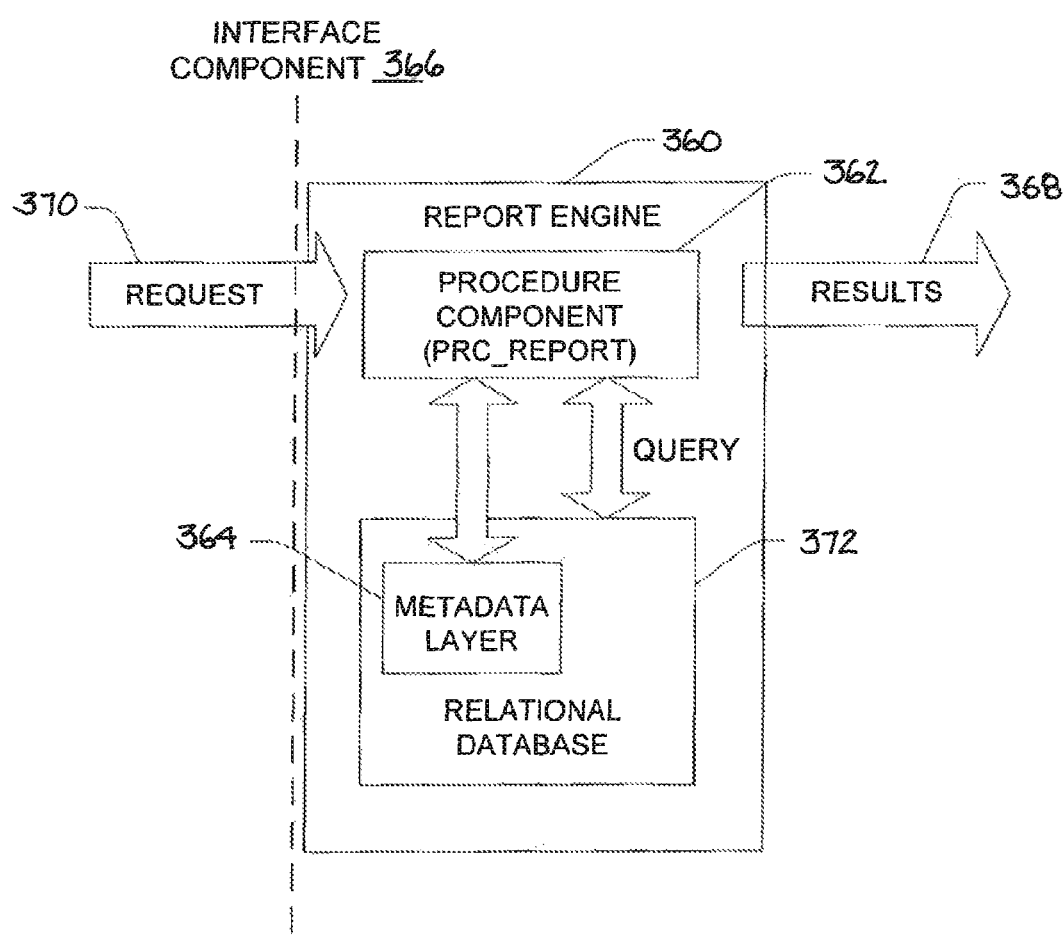
FIG. 23 is a block diagram illustrating a reporting engine in one embodiment of the present invention.

FIG. 23 illustrates a reporting engine 360 in block diagram form that is coupled to system 10. The reporting engine generates reports from the clustered clustering events and/or messages. In one embodiment, the report engine 360 is coupled to the situation room 18.

In one embodiment, computer-executable instructions implement the reporting engine 360. In one embodiment, the instructions include a predefined procedure component 362, a metadata component, or layer, 364, and an interface component 366 illustrated in FIG. 24.

Reporting engine 360 generates a report at 368 from the clustered events and/or messages which can be retrieved from situation room 18. In one embodiment, the reporting engine 360 is in communication with one or more dashboards associated with the situation room and retrieves information therefrom in response to a request received at 370 for selected information that is used to generate a report.

As non-limiting examples, reports can include but are not limited to, graphical using charts/tables, and the like on a display screen and printed in tabulated and graphical form; inter-alia: composite metrics that can include:

system or infrastructure components health; operator efficiency (average time taken to detect and resolve incident as described by a cluster); detail on a monitored incident; USR interactive reports; SCA (service legal agreement) compliance, and the like.

In one embodiment, the clustered events/messages are in a database 372 illustrated in FIG. 23. The metadata layer 364 can be maintained separately or together with the data to be searched in database 372.

In one embodiment, queries regarding the clustered events/messages are answered through reports generated from, as a non-limiting example, structured query language (SQL) statements that need to be heavily customized as new report requirements arise. Those skilled in the art are familiar with the use of SQL statements or strings to define SQL commands typically used in queries and aggregate functions.

In one embodiment, reporting engine 360 has three main parts, i.e., the metadata layer 364, the interface 366 embodying simplified query syntax, and the procedure component 362.

As an example, database 372 represents an exemplary data warehouse containing the clustered events/messages. The clustered events/messages can have several dimensions.

As a non-limiting example, a procedure component 362, shown in FIG. 23 by a predefined, stored procedure, prc_report, reporting engine 360 returns a result set at 368 that matches the user-specified format and search conditions, as indicated at 370.

In one embodiment, the metadata in metadata layer 364 describes the clustered events/messages that can be in database 372 or accessed via a dashboard directly according to one or more of its characteristics, such as its data type. As a non-limiting example, metadata layer 364 can include entities and SQL view describing the related dimensions, attributes, measures, and/or facts relative to the clustered events/messages.

As a non-limiting example, an attribute can be a descriptive characteristic of one or more levels representing logical groupings that enable end users to select information based on like characteristics. An attribute can be a column or row in a dimension that characterizes elements of a single level. A measure can be a numeric value stored in a fact table or cube.

As a non-limiting example, to extract information out of system 10, including database 372, procedure component 362 first accepts inputs from the user at 370 according to the query syntax of interface 366. In turn, procedure component 362 takes the inputs, matches them with metadata layer 364, and constructs a set of SQL statements to retrieve information from the clusters. When reporting engine 360 receives a request for information to be retrieved it uses the metadata. Procedure component 362 then constructs a query (e.g., one or more SQL statements) based on the fact table's SQL view, runs the query, and returns the result in the form of a report.

Figure 24:
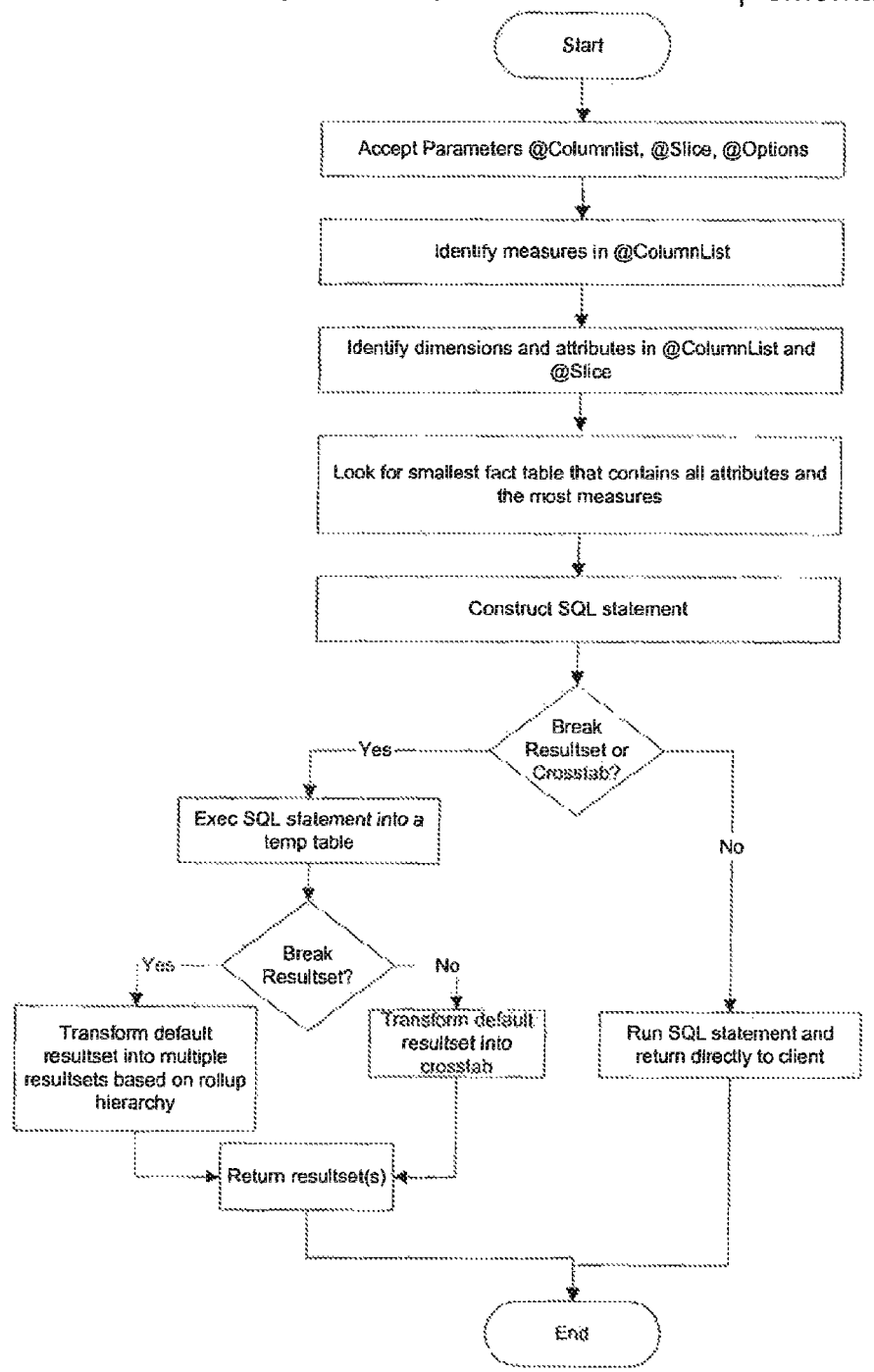
FIG. 24 illustrates one embodiment of a flow diagram relative to a reporting engine such as the one shown in FIG. 23.

Referring now to FIG. 24, an exemplary flow diagram illustrates aspects of reporting engine 360 including interface component 366.

Figure 25:
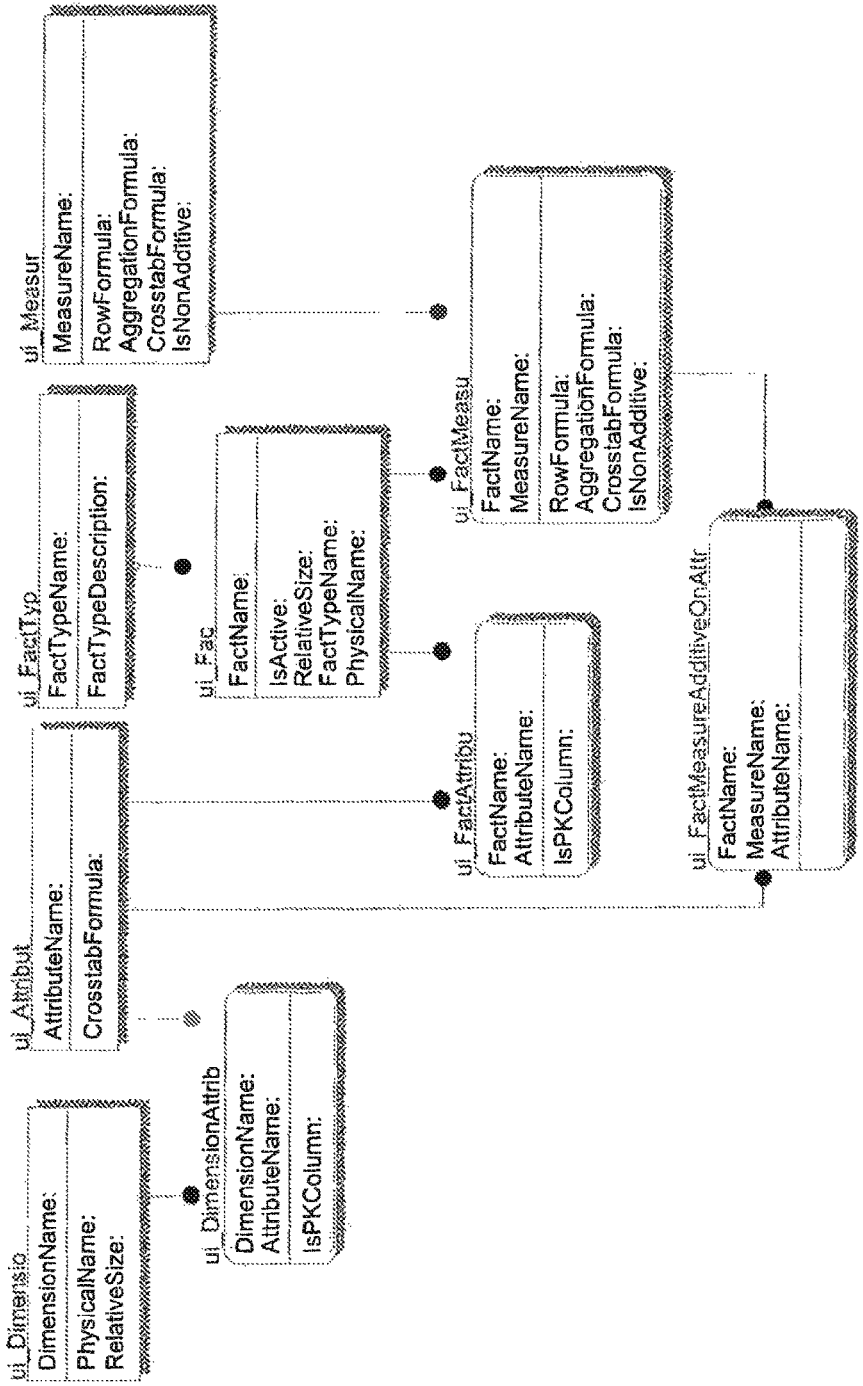
FIG. 25 illustrates in a block diagram one embodiment of reporting engine metadata that can be used with the present invention.

FIG. 25 is a block diagram illustrating an exemplary reporting engine metadata reporting framework The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Particularly, while the concept "component" is used in the embodiments of the systems and methods described above, it will be evident that such concept can be interchangeably used with equivalent concepts such as, class, method, type, interface, module, object model, and other suitable concepts. Embodiments were chosen and described in order to best describe the principles of the invention and its practical application, thereby enabling others skilled in the relevant art to understand the claimed subject matter, the various embodiments and with various modifications that are suited to the particular use contemplated.

What is claimed is:

1. An event clustering system with a processor that generates reports, comprising:
    an extraction engine in communication with an infrastructure, the extraction engine in operation receiving data from the infrastructure and produces events and populates a database with a dictionary of event or graph entropy;
    an alert engine that receives the events and creates alerts mapped into a matrix, M;
    a signalizer engine that includes one or more of an NMF engine, a k-means clustering engine and a topology proximity engine, the signalizer engine determining one or more common steps from events and produces clusters relating to the alerts and or events, where membership in a cluster indicates a common factor of the events that is a failure or an actionable problem in the physical hardware of the infrastructure directed to supporting the flow and processing of information;
    the topology proximity engine using a source address for each event and topology of the infrastructure which represents node to node connectivity of the topology proximity engine and to assign a graph coordinate of a graph to the event with an optional subset of attributes being extracted for each event and turned into a vector of the graph, the topology engine inputs a list of devices and a list a connections between components or nodes in the infrastructure where the graph entropy is calculated for each node in the graph;

one or more interaction displays that provide a collaborative interface a coupled to the extraction and the signalizer engine for decomposing events from the infrastructure; and a reporting engine configured to be coupled to the event clustering system, the reporting engine configured to generate a report from at least one of the clusters and the events that are retrieved from the collaborative interface a source address for each event to assign a graph coordinate in the graph to the event with an optional subset of attributes being extracted for each event and turning that into a vector of the graph; and in response to production of the clusters making one or more physical chances in the infrastructure hardware.

2. The system of claim 1, wherein the reporting engine generates reports from the clustered events and/or messages.

3. The system of claim 1, wherein the report engine is coupled to a situation room of the event clustering system.

4. The system of claim 1, wherein computer-executable instructions implement the reporting engine.

5. The system of claim 4, wherein the instructions include a predefined procedure component, a metadata component, or layer, and an interface component.

6. The system of claim 1, wherein the reporting engine generates a report from the clustered events and/or messages which can be retrieved from a situation room.

7. The system of claim 1, wherein the reporting engine is in communication with one or more dashboards associated with a situation room and retrieves information therefrom in response to a request that is used to generate a report.

8. The system of claim 5, wherein clustered events/messages are in a database.

9. The system of claim 8, wherein the metadata layer is maintained separately or together with the data to be searched in the database.

10. The system of claim 1, wherein queries regarding the clustered events/messages are answered through reports generated from structured query language (SQL) statements.

11. The system of claim 1, wherein the reporting engine includes a metadata layer, an interface and a procedure component.

12. The system of claim 1, wherein the clustered events/messages have several dimensions.

13. The system of claim 12, wherein one of the dimensions is a procedure component.

14. The system of claim 13, wherein the procedure component is a predefined, stored procedure report, with the reporting engine returning a result set that matches a user-specified search.

15. The system of claim 11, wherein metadata in the metadata layer describes clustered events/messages that can be in a database or accessed via a dashboard directly.

16. The system of claim 15, wherein the metadata layer includes entities and SQL views describing at least one of, related dimensions, attributes, measures, and facts relative to the clustered events/messages.

17. The system of claim 15, wherein an attribute is a descriptive characteristic of one or more levels representing logical groupings that enable end users to select information based on like characteristics.

18. The system of claim 15, wherein an attribute is displayed as a column or row in a dimension that characterizes elements of a single level.

19. The system of claim 13, wherein the procedure component accepts inputs from a user according to a query syntax of interface.

20. The system of claim 19, wherein the procedure component takes the inputs and matches them with a metadata layer.

21. The system of claim 20, wherein following the matching a set of SQL statements retrieves information from the clusters.

22. The system of claim 20, wherein in response to the reporting engine receiving a request for information to be retrieved it uses the metadata.

23. The system of claim 22, wherein a procedure component of the reporting engine constructs a query that is run and a report is returned.

* * * * *